United States Patent
Yamada et al.

(10) Patent No.: US 6,563,601 B1
(45) Date of Patent: *May 13, 2003

(54) SYSTEM FOR PRINTING IMAGE DATA DIVIDED AT A BREAK POINT

(75) Inventors: Akitoshi Yamada, Irvine, CA (US); Hiromitsu Hirabayashi, Irvine, CA (US)

(73) Assignee: Canon Business Machines, Inc., Costa Mesa, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/901,565

(22) Filed: Jul. 28, 1997

(51) Int. Cl.⁷ .............................................. G06F 15/00
(52) U.S. Cl. ......................................... 358/1.9; 358/1.1
(58) Field of Search ................................ 395/101, 102, 395/103, 104, 105, 108, 109, 111, 112, 113, 117; 347/37, 15, 194; 358/515, 1.1, 1.2, 1.3, 1.4, 1.5, 1.8, 1.9, 1.12, 1.13, 1.14, 1.18; 400/82, 323

(56) References Cited

U.S. PATENT DOCUMENTS

| | | | |
|---|---|---|---|
| 4,204,779 A | 5/1980 | Lee et al. ................. 400/144.2 |
| 4,272,771 A | 6/1981 | Furukawa ..................... 346/75 |
| 4,651,166 A | * 3/1987 | Katsuragi ................... 347/194 |
| 5,044,796 A | 9/1991 | Lund .......................... 400/323 |
| 5,119,108 A | 6/1992 | Hatakeyama ................ 346/1.1 |
| 5,247,352 A | * 9/1993 | Nagler et al. ................ 358/515 |
| 5,248,993 A | * 9/1993 | Oshino et al. .............. 347/211 |
| 5,428,375 A | * 6/1995 | Simon et al. ................. 347/12 |
| 5,619,233 A | * 4/1997 | Harrington ................... 347/37 |
| 5,630,027 A | * 5/1997 | Venkateswar et al. ...... 395/108 |
| 5,696,542 A | 12/1997 | Matsubara et al. ........... 347/12 |
| 5,696,842 A | * 12/1997 | Shirasawa et al. .......... 382/176 |
| 5,708,463 A | 1/1998 | Hirabayashi et al. ......... 347/43 |
| 5,749,662 A | * 5/1998 | Shibasaki et al. ............. 400/82 |

FOREIGN PATENT DOCUMENTS

| | | |
|---|---|---|
| EP | 724965 | 8/1996 |
| EP | 779734 | 6/1997 |
| JP | 50-81437 | 11/1974 |
| JP | 62055156 | 3/1987 |
| JP | 6-270488 | 9/1994 |

* cited by examiner

Primary Examiner—Gabriel Garcia
(74) Attorney, Agent, or Firm—Fitzpatrick, Cella, Harper & Scinto

(57) ABSTRACT

A printing system in which an image is printed within multiple printable areas of a recording medium, the multiple printable areas defining an overlapped printing area, includes detection of a break position in image data to be printed within the overlapped printing area using at least one of a plurality of break detection systems on the image data to be printed within the overlapped printing area, selective division of, at the detected break position and among the multiple printable areas, the image data to be printed within the overlapped printing area, and printing of the divided image data within the multiple printable areas.

90 Claims, 24 Drawing Sheets

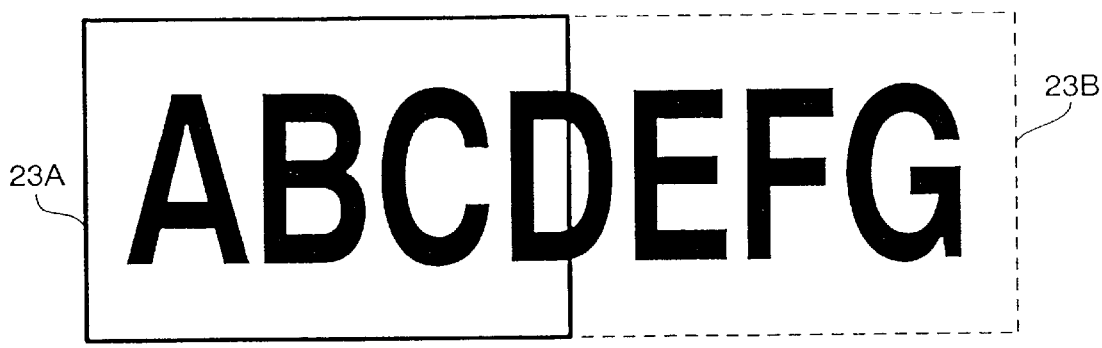
FIG. 6A
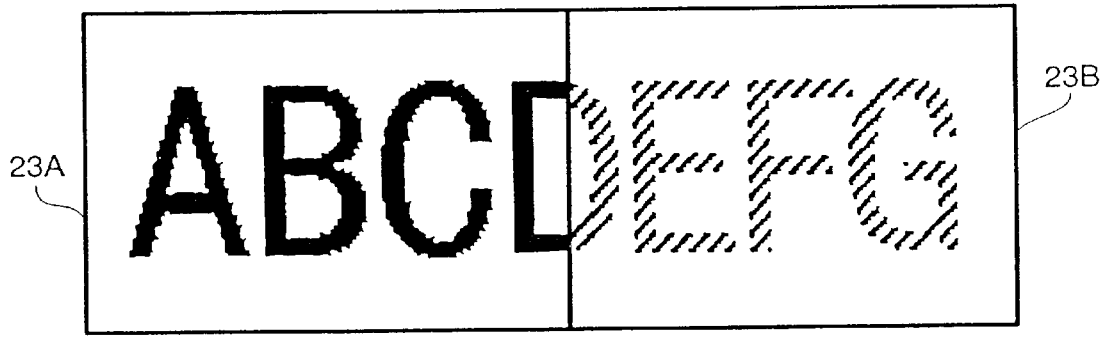
FIG. 6B
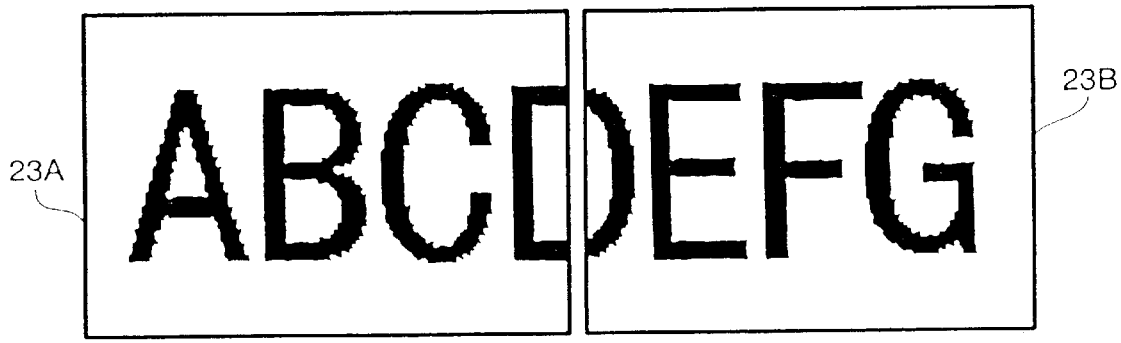
FIG. 6C
FIG. 6

SYSTEM FOR PRINTING IMAGE DATA DIVIDED AT A BREAK POINT

BACKGROUND OF THE INVENTION

1. Field of the Invention

The present invention pertains to serial printing devices which print characters and images in multiple printing areas of a print medium by scanning printheads across the print medium. In particular, this invention provides for improved output from shuttle-type printing devices in which multiple printheads are disposed at a fixed distance from each other and wherein each printhead scans and prints over a divided section of a print medium.

2. Description of the Related Art

Some conventional printing devices utilize full-line printheads, which are capable of simultaneously printing an entire line of data upon a print medium. Unfortunately, such printheads are quite expensive.

In contrast, serial printing devices operate by scanning a printhead across a print medium. The printhead forms images upon the print medium as it is scanned across. Such printheads are required to print only a small amount of data at any one time and are therefore generally less expensive than full-line printheads. Accordingly, the serial printing method is widely utilized in various printing devices.

In a serial printing device, a printhead is capable of printing data on a relatively limited area at any one time. This area is defined by printing elements such as ink jet nozzles on the printhead. Accordingly, in order to print over an entire page, a serial printhead is placed on a carriage which scans over the page, thereby printing an image as a combination of separately-printed areas. These areas are commonly referred to as swathes, or bands.

In a generic serial printer, a discontinuity (banding) appears between adjacent bands each time adjacent bands are printed. The banding occurs in a generic serial printer because a distance that a print medium travels after one band is printed does not coincide with a width of the printhead. Therefore, a subsequently-printed band is not located in a correct area of the medium. Furthermore, even if the traveling distance of a print medium is the same as the width of a printhead, banding often occurs in a ink jet printing device because ink at the edge of bands tends to smear.

In addition, in a case where adjacent bands have a different density, the density difference is pronounced at a boundary between the bands. Density differences occur because bands are printed at different times or because of differences in temperatures of a printhead during printing of adjacent bands.

In a serial printing method in which a collection of bands forms an image, it is relatively difficult to improve printing speed. In this regard, dual-directional printing has been proposed. In such printing, bands are printed by a printhead during scanning in each of two opposite directions.

Although this dual-directional printing method improves printing speed by a factor of two in comparison to a single-directional serial printing method, image quality degrades because of slight differences in printing position between one scanning direction and the other. This registration misalignment occurs due to reasons such as backlash of a scanning mechanism.

A technique to address the banding problem by utilizing dual-directional printing is described in U.S. Pat. No. 5,044,796. According to this technique, upon detecting a break or gap in image data to be printed, printing of the data is performed in both scanning directions across the break. If a break is not detected in image data to be printed, printing is performed in only one scanning direction.

During serial printing, a printhead occasionally heats to an abnormal temperature. On such occasions, printing is interrupted in order to protect the printhead. After the printhead cools down to a certain temperature or, alternatively, after a certain length of time passes, printing is continued from the location at which the interruption took place. In such instances, image density differences occur at the interrupt location due to the difference in printhead temperature before and after the interruption. In addition, printhead registration may not exactly match before and after such an interruption, thereby causing a discontinuity to appear in a printed image along the direction of an array of printing elements.

It should be noted that banding due to temperature increases during printing is not limited to a printhead which utilizes heat, such as a thermal or bubble jet printhead. It may also occur with printheads utilizing actuator wires for dot-matrix printing.

In other instances, an electric power supply having a limited power capacity is used in order to reduce the cost of a printer power supply. Such a power supply allows all printing elements to be used simultaneously to print on a single scanning path only when an image to be printed has a low density, as in the case of a text-based document image. On the contrary, such a power supply does not allow all printing elements to be used simultaneously on a single scanning path in a case where an image to be printed has a high density, such as a picture.

For a high-density image, a band which could be printed by all printing elements is sub-divided in order to reduce power consumption during one scanning path. For example, half of the printing elements are used during a first scan and a second scan, using the remaining elements, completes printing of the band. In such a case, a density difference or another type of discontinuity may appear between the sub-bands printed during the two scans.

U.S. Pat. 4,272,771 and corresponding Japanese Laid-Open Patent Application No. 50-81437 describe a method for improving the printing speed of a serial image printing device. According to these documents, the left and right halves of each printed line are printed simultaneously. To accomplish this simultaneous printing there are provided separate left and right printhead assemblies, both of which are supported by one common carriage mechanism. Accordingly, print speed is doubled over similar single-printhead systems. Furthermore, these documents claim that further increases in printing speed can be achieved by using more than two printhead assemblies or by printing in both directions of the scanning movements.

It should be noted that such multiple-printhead systems experience problems similar to those described above with respect to conventional single-printhead serial devices.

In particular, registration adjustment between printheads is quite important in a printing device having multiple printheads which print simultaneously on a same print medium. If the vertical registration (transverse registration) is not adjusted correctly, a vertical mismatch will occur in an image printed by the left and right printheads. This mismatch is very noticeable at a boundary between the two areas printed by the left and right printheads. If the horizontal registration (lateral registration) is not adjusted correctly, the two areas printed by the left and right printheads become separated or overlapped.

Moreover, areas adjacent to the boundary between the printing areas of the left and right printheads are printed at different times. Hence, as described above, the time difference creates recognizable density differences between the areas. Furthermore, if the left and right printhead are at different temperatures, a corresponding density difference appears at a boundary between the areas. In addition, recognizable density differences occur due to differences in output density characteristics of the left and right printheads.

In order to address the above problems, Japanese Laid-Open Patent Application No. 6-270488 discloses a technique to alter the area divisions corresponding to left and right printheads or left and right scanning motions by detecting a break in an image which runs in the direction of image columns (the direction of an array of printing elements).

The techniques in the description of U.S. Pat. No. 5,044,796 or Laid-Open Patent Application No. 6-270488 are effective when an image consists of simple characters and therefore breaks run in a direction of a printed character row or a column. However, the techniques are not effective when an image does not contain breaks. Examples of an image without breaks are those containing special characters, such as underlined characters, or a picture. These techniques also fail to address detection of breaks which are skewed with respect to column or row direction, and breaks which are not linear. Furthermore, these techniques do not disclose any method for detecting breaks in multiple-bit (multilevel) image data.

Moreover, as described above with respect to the serial printing method, an image suffers from density differences, banding, and registration misalignment between adjacent bands either along the scanning direction of printheads or in the direction of a printing element array.

Therefore, while density differences in an image based on temperature, time, or printhead output density characteristics can be corrected to some extent using known techniques, further improvement is desired. Also, while banding can be corrected to some extent by adjusting image density at the edge of bands, further improvement is desired. For registration misalignment, while it can be compensated to some extent by mechanical or electrical adjustment, further improvement is also desired.

SUMMARY OF THE INVENTION

One purpose of this invention is to provide a printing device, a printing method and a printer driver which produce a printed image having little image degradation, in a case that the image is composed of a combination of multiple printable areas.

Another purpose of this invention is to provide a printing device, a printing method and a printer driver which produce a printed image with little noticeable density differences, banding, and registration misalignment, in a case that the image is composed of a combination of multiple printable areas.

In order to achieve the above purposes, this invention is characterized by a printing system in which an image is printed within multiple printable areas of a recording medium, the multiple printable areas defining an overlapped printing area, and which includes detection of a break position in image data to be printed within the overlapped printing area using at least one of a plurality of break detection systems on the image data to be printed within the overlapped printing area, selective division of, at the detected break position and among the multiple printable areas, the image data to be printed within the overlapped printing area, and printing of the divided image data within the multiple printable areas.

This brief summary has been provided so that the nature of the invention may be understood quickly. A more complete understanding of the invention can be obtained by reference to the following detailed description of the preferred embodiments thereof in connection with the attached Figures.

BRIEF DESCRIPTION OF THE DRAWINGS

FIG. 6, comprising FIG. 6A to FIG. 6C, shows an image printed using two printheads.

DETAILED DESCRIPTION OF THE PREFERRED EMBODIMENTS

The foregoing embodiments of the present invention are described in view of the above-mentioned Figures.

(The First Preferred Embodiment)

Figure 1:
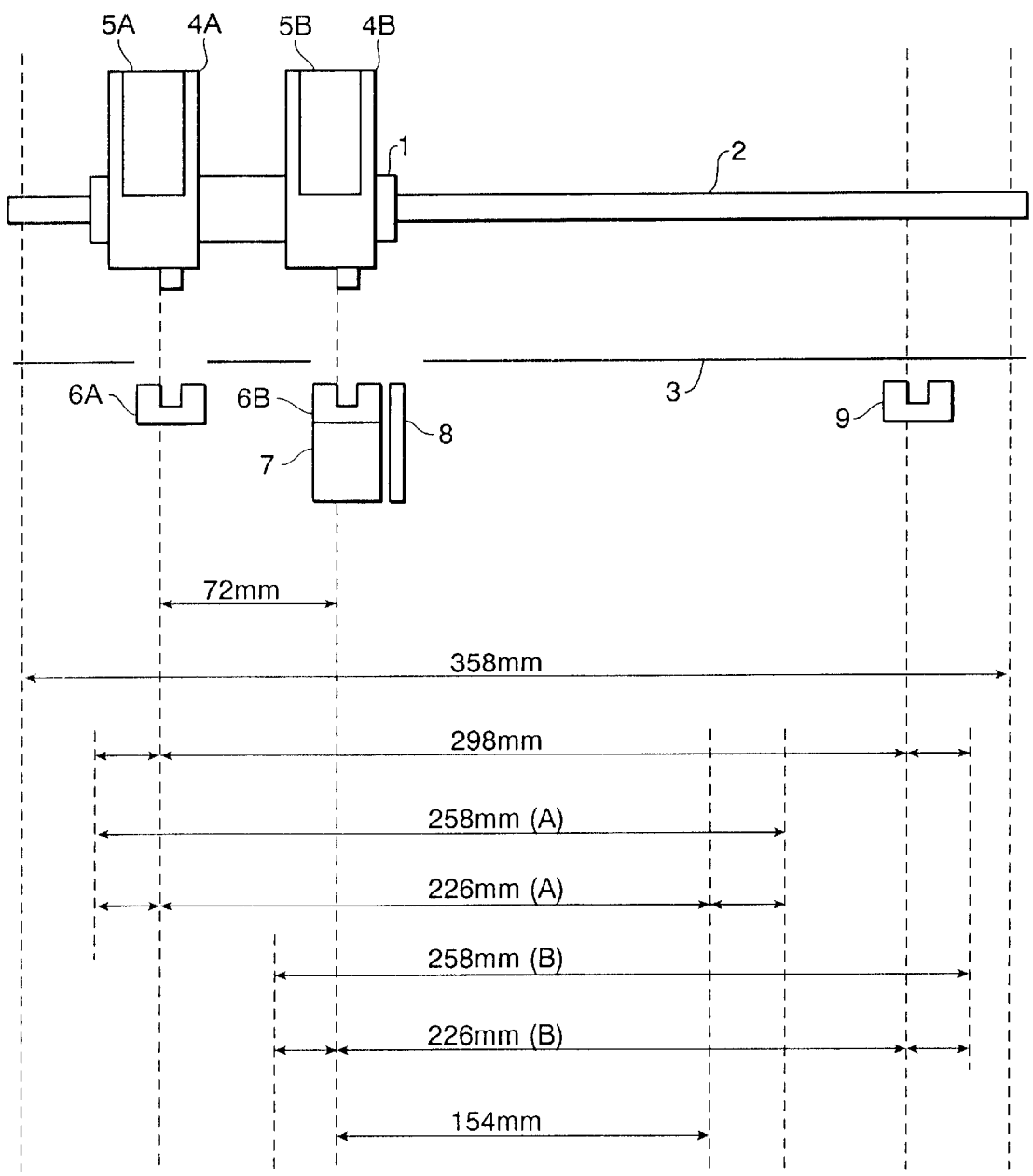
FIG. 1 illustrates regions of divided printing and overlapped printing in a case where two printheads are used in a printing device.

FIG. 1 shows printheads 4A and 4B mounted on carriage 1 at a separation of 72 mm. Printheads 4A and 4B support, respectively, ink tanks 5A and 5B. Ink stored in the tanks is provided to the printheads during printing. This design allows for independent installation and removal of each tank and each printhead on the carriage 1. Alternatively, a printhead and a tank can be formed as one unit, and the combined unit can be installed on and removed from carriage 1.

Carriage 1 is supported on guide rail 2 and can be moved freely by virtue of a drive mechanism, such as a drive belt. As a result, carriage 1 can be located anywhere within the scannable space, denoted by "358 mm" in FIG. 1. In addition, the Ad ink jet nozzles of each of printhead 4A and 4B can be located anywhere within each of scanning areas "258 mm(A)" or "258 mm(B)" respectively. Excluding ramp up and ramp down areas, at which carriage 1 accelerates and decelerates, printhead 4A scans in its divided printing area "226 mm(A)", and printhead 4B scans in its divided printing area "226 mm(B)".

Caps 6A and 6B are used for the ink jet nozzles of printheads 4A and 4B, respectively, under a platen 3 within the scannable space of the carriage 1. The carriage 1 rests over the platen at a home position, whereat each ink jet nozzle is capped with either cap 6A or 6B. Pump 7 is connected to cap 6B and removes ink through cap 6B. Each of heads 4A and 4B travels to a position facing cap 6B sometime during operation therefore ink can be removed from either printhead using pump 7.

Wiper 8 is provided adjacent to cap 6B. Wiper 8 moves outward at a certain time into the path of one of the printheads and wipes ink jet nozzles of the printhead as it comes in contact with wiper 8. In addition, dummy ejection receptor 9 is provided on the opposite end of the scannable space of printhead 4A from "226 mm(B)" where cap 6A is located. Printhead 4B can travel to this position sometime during operation and perform a dummy ejection. Similarly, printhead 4A can perform a dummy ejection after it travels to a position facing cap 6A.

The foregoing arrangement maximizes the printable area within the scannable space.

In the above-described embodiment of a printing device, the printhead separation distance (72 mm), is preferably set to approximately one-quarter of the maximum printable area (298 mm). The printable area is maximized by dividing it into two scanning areas for each printhead. The width of the overlapped scanning area is 154 mm. These sizes are defined as follows. The width of A3 paper (297 mm×420 mm) is the width of the maximum printable area. The width of the overlapped scanning area corresponds to the width of A5-sized paper (148 mm×210 mm). Therefore, the width of the maximum printable area is defined at approximately twice that of the overlapped scanning area.

In this preferred embodiment, each of printheads 4A and 4B print on assigned printing areas, respectively, in a case where the instrument prints on A3-sized paper. In this case, both printheads preferably eject the same type of ink. On the other hand, when the printing instrument prints on A5-sized paper, which is the width of the overlapped printing area, one printhead may be replaced by a type of printhead which ejects ink with a lighter color so that ink with darker and lighter colors may be printed at areas of the page which can be accessed by both printhead 4A and printhead 4B.

Accordingly, the printing device of the embodiment of FIG. 1 can print faster over A3-sized print media than a printing device with one printhead because the work of printing over the maximum printable area is divided between two printheads. In addition, the size of the printing device of FIG. 1 is smaller than other devices having the same maximum printable area.

The design of this preferred embodiment benefits single color printing, such as black and white. However, when using multiple color inks for color printing, the benefits are more pronounced.

Regarding color printing, there are several types of printing devices which utilize a print medium which itself generates color. Examples of such devices include a device in which heating elements on a thermal printhead heat special thermal paper, thereby generating color, and a device in which optical effects create color upon photosensitive paper.

On the other hand, various methods are used in which printheads transfer color ink onto print media. For example, in an impact printing method, ink ribbons contain liquid color ink which is transferred to a print medium when printing wires press the ribbons against the print medium. In thermal melt and sublimation transfer printing methods, heating elements on a thermal printhead heat solid ink on ink ribbon printheads and transfer the ink to a print medium. In an ink jet method, liquid ink is ejected onto a print medium.

Of the above examples, devices in which color ink is transferred onto print media are used more widely due to their use of ordinary paper. Among these methods, ink jet printing has the advantages of low noise, lower operation cost, ease of miniaturization, ability to use ordinary paper, and ease of color printing. Hence, this method is widely used in various printing devices, such as printers and photocopiers.

In this preferred embodiment, four color inks, black (Bk), cyan (C), magenta (M) and yellow (Y) are used. Four individually replaceable tanks, one for each color ink, Bk, C, M or Y, are installed on the central portion of carriage 1 of FIG. 1. Each printhead is equipped with a group of ink jet nozzles, each of which ejects, respectively, Bk, C, M or Y ink. The four ink tanks supply color ink to both printheads. Even though this embodiment is designed to supply ink from common ink tanks to each printhead, applications of this invention are not limited to this design. For example, each printhead can be equipped with an exclusive ink tank and each tank can thereby form a single unit with its respective printhead. Also, such tanks can be made removable from the printheads.

Figure 2:
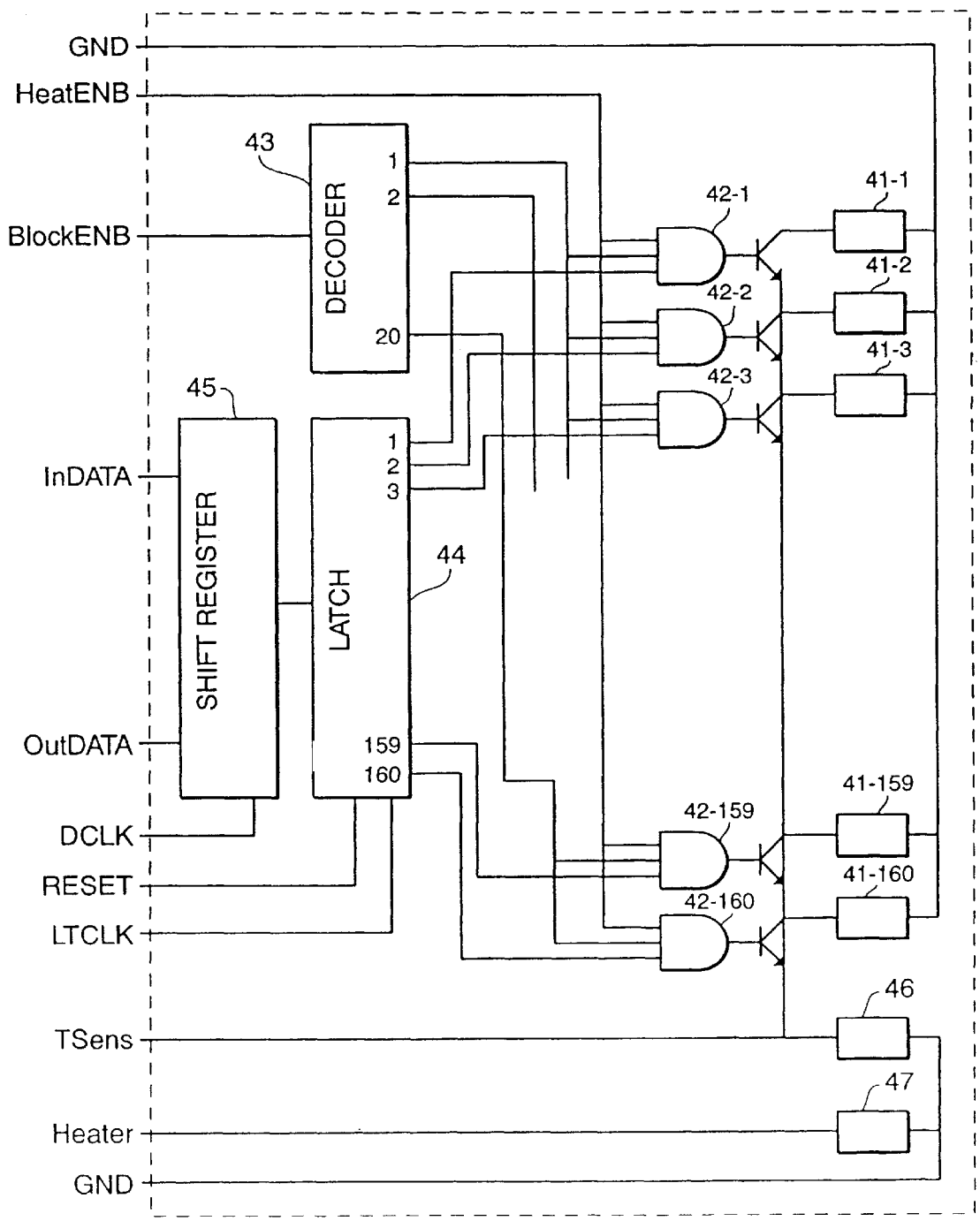
FIG. 2 is a block diagram of a driving circuit for use with the printheads used in the printing device of FIG. 1.

FIG. 2 is a block diagram of a heater driver of a printhead similar to printheads 4A and 4B. Heaters 41-1, 41-2, . . . , 41-160 each correspond to a respective ink jet nozzle used for a particular color ink. Accordingly, each nozzle may be individually heated. Here, 24 heaters 41 are used for each of 24 Y (yellow) nozzles, 24 M (magenta) nozzles, and 24 C (cyan) nozzles. 64 heaters 41 are used for 64 K (black) nozzles, and 8 heaters 41 for each of 8 nozzles disposed between each of these colors. When all of the heaters 41 are turned on at the same time, a large current flows and the load on the power supply increases. In addition, because voltage drops across the circuit impedance, the energy supplied to each of the heaters decreases. This situation may jeopardize normal printing functions. Thus, a concern for the ill-effect on image quality also arises.

Accordingly, in this preferred embodiment, printheads are installed at a small angle, and the well-known method of time-sharing driving is used for heater control. Under this time-sharing driving method, heaters are grouped into blocks, each of which contains the same number of heaters. In addition, the image data and print timing are adjusted block-by-block for ink ejection.

Various ways of realizing the time-sharing driving method are proposed and implemented. Any of these methods can be used. In this preferred embodiment, color ink jet nozzles are divided into 20 blocks. Each block contains 8 ink jet nozzles. Each block ejects ink sequentially, one after another, with a certain constant interval. The printheads are installed at an angle in order to compensate for the scanning speed of the printheads and the ejection time differences among the ink jet nozzle blocks. The angled installation of the printheads prevents the ejection time differences among the ink jet nozzle blocks from causing a straight line to be slanted.

During printhead operation, ink is provided via shared liquid chambers located behind the ink paths leading to the nozzles. One liquid chamber is provided for each ink color. Ink is supplied from the shared liquid chambers through ink supply pipes to ink tanks 5A and 5B. Heater 41 and electrical wires are installed on the ink path leading to each ink jet nozzle. Heater 41 is a thermo-electrical converter which generates thermal energy for ink ejection. The electrical wires supply power to the heater. The heater and electrical wires are formed on a substrate such as a silicon wafer using thin film technology. A protective film is formed on heater 41 so that the heater does not come into direct contact with ink. Furthermore, the ink jet nozzle, ink path and shared liquid chamber are formed by stacking walls made of material such as resin and glass.

Once heater 41 heats the ink inside a nozzle to boiling, bubbles are formed within the ink. The bubble formation increases pressure within the ink jet nozzles, and the increased pressure causes ink droplets to be ejected toward a print medium. An ejected ink droplet for each color weighs approximately 40 ng. This printing method is generally called bubble jet printing.

AND gates 42-1 to 42-160 logically multiply a selection signal from a decoder 43, driving data from latch circuit 44 and a heat enable'signal (Heat ENB). The selection signal is used in the time sharing process and the heat enable signal dictates the driving time. A shift register 45 converts serial image data input signals into parallel signals and outputs the resulting driving data to the latch circuit 44. The resulting output signal is transmitted to respective heater 41.

Temperature sensors 46 are provided on printheads 4A and 4B in this preferred embodiment. The sensors monitor the respective temperatures of printheads 4A and 4B. Generally, optimum driving conditions for the printheads are determined depending on the temperatures of printheads 4A and 4B. A protective mechanism is operated which is also based on the temperature information. Each of these provisions improve the stability of the printing characteristics. Furthermore, temperature control heaters 47 are provided on printheads 4A and 4B in order to maintain printheads 4A and 4B at a particular temperature.

Figure 3A:
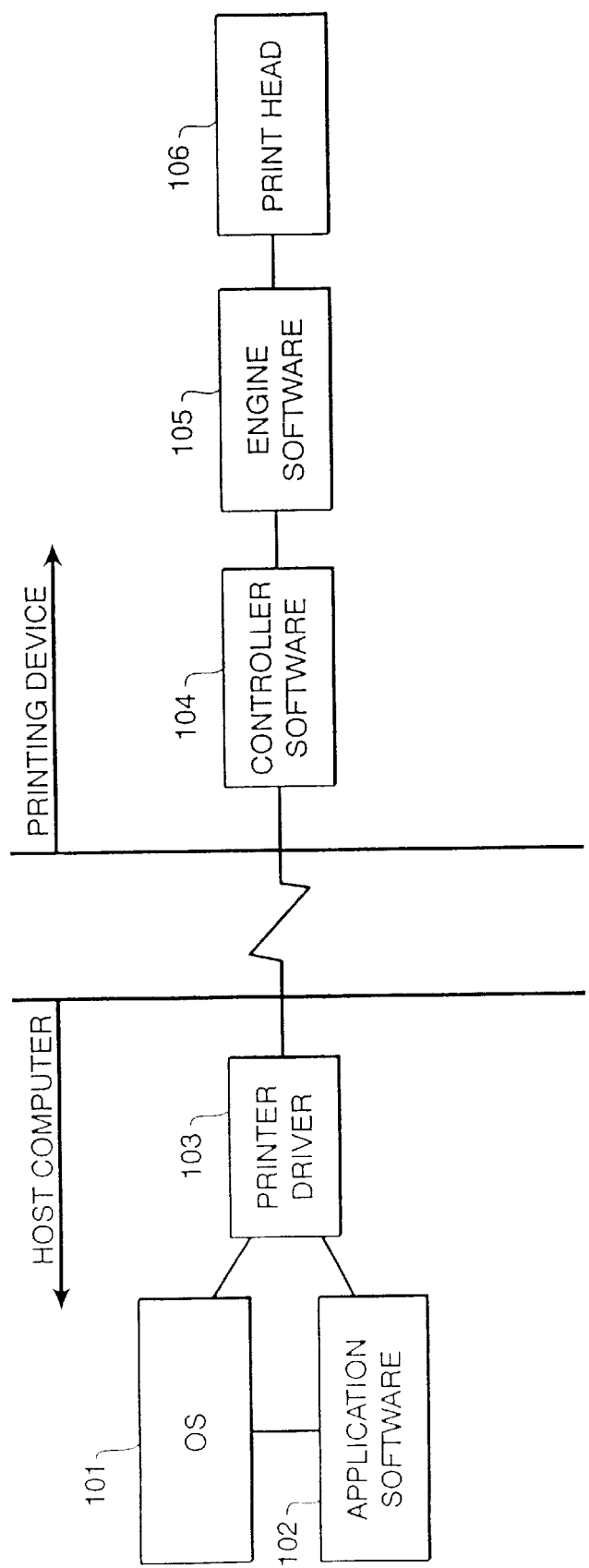
FIG. 3A shows a system configuration which illustrates the interface between a printing device and a host computer.

FIG. 3A shows a system which comprises a printing device and a host computer which functions as a hosting instrument. In the host computer, various data processing is performed by OS (Operating System) 101 in conjunction with application software 102. In operation, image data is generated by application software 102 and printer driver 103 outputs the image data to the printing device.

The image data is sent to printer driver 103 as multilevel RGB data. After half-tone processing, the data is usually converted into binary CMYK data. The host computer then outputs the converted image data through a host computer/printing device interface or a file storage device interface. In the instance shown in FIG. 4A, the image data is output via a printing device interface.

The printing device receives the image data under the control of controller software 104, checks items such as printer mode and compatibility with printheads 106, and transfers the image data to engine software 105. Engine software 105 interprets the received image data as having the print mode and the data structure as instructed by the controller software 104 and generates pulses for the ink jet nozzles based on the image data. The pulses are sent to printheads 106. Printheads 106 use the pulses to eject color ink which corresponds to the pulses and to thereby print a color image on a print medium.

Figure 3B:
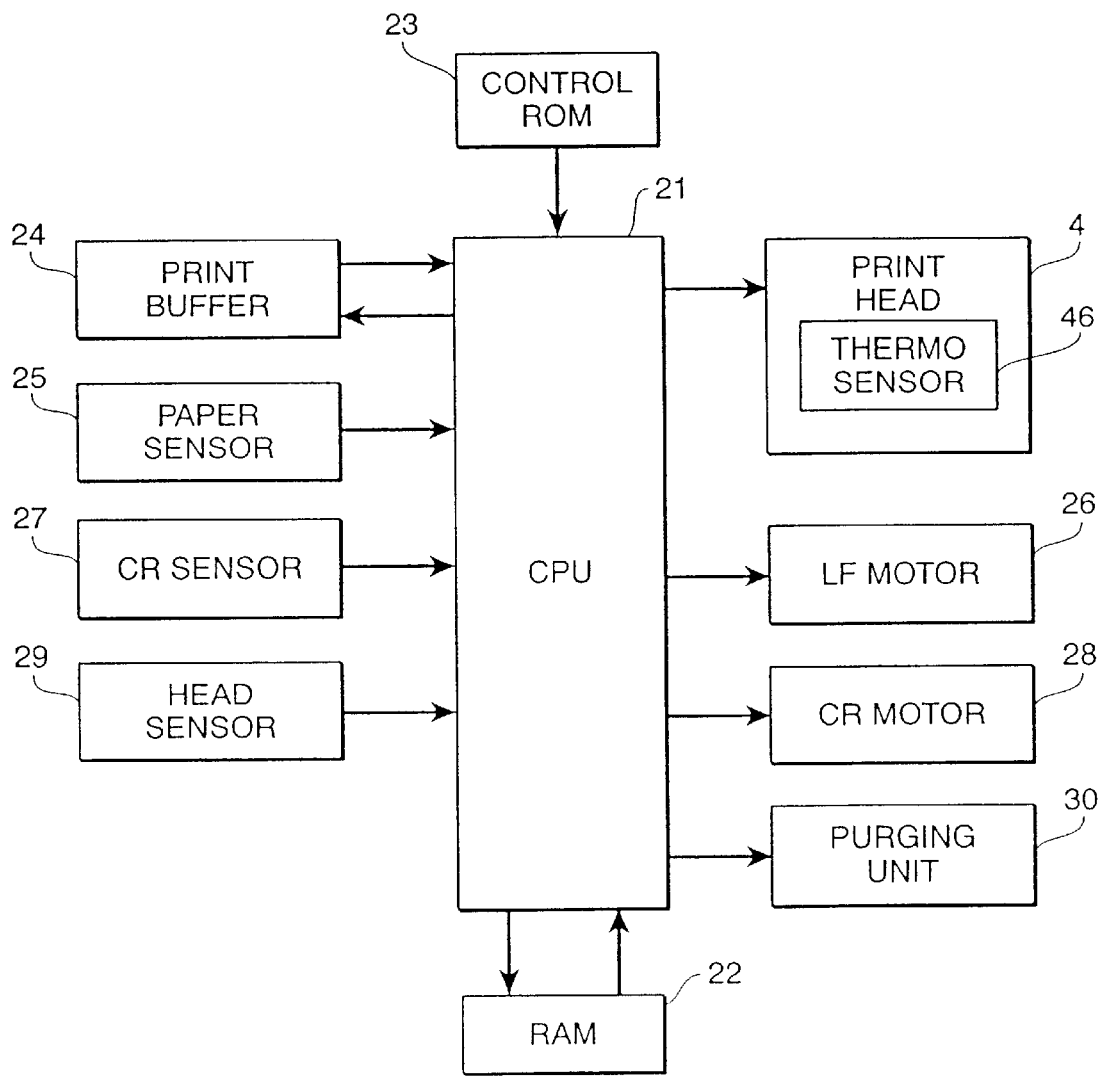
FIG. 3B is a block diagram of a controller for a printing device in accordance with the present invention.

FIG. 3B shows a block diagram of the printing device of FIG. 3A. Image data to be printed is transmitted into a receiving buffer in the printing device. In addition, data to acknowledge the correct receipt of image data by the printing device and data to show the operational status of the printing device are sent from the printing device to the host computer. The data in the receiving buffer is controlled under the management of CPU 21, stored temporarily in print buffer 24, and given to printheads 4A and 4B as print data.

Based on the information from paper sensor 25, CPU 21 sends commands to a paper forwarding mechanism. The paper forwarding mechanism, such as line feed motor 26, controls mechanical drivers such as paper forwarding rollers or line feed rollers based on commands from CPU 21. CPU 21 also sends commands to carriage-return driving mechanism 28 based on information from carriage return sensor 27. The carriage return mechanism 28 controls a carriage-driving power supply and thereby controls the movements of carriage 1. Purging unit 30 protects heads 4A and 4B and optimizes the driving conditions, using commands from the CPU 21. CPU 21 sends such commands based on information sent by printhead sensor 29. Printhead sensor 29 comprises many sensors, for example, sensors such as those used to determine whether or not ink is present.

Figure 4:
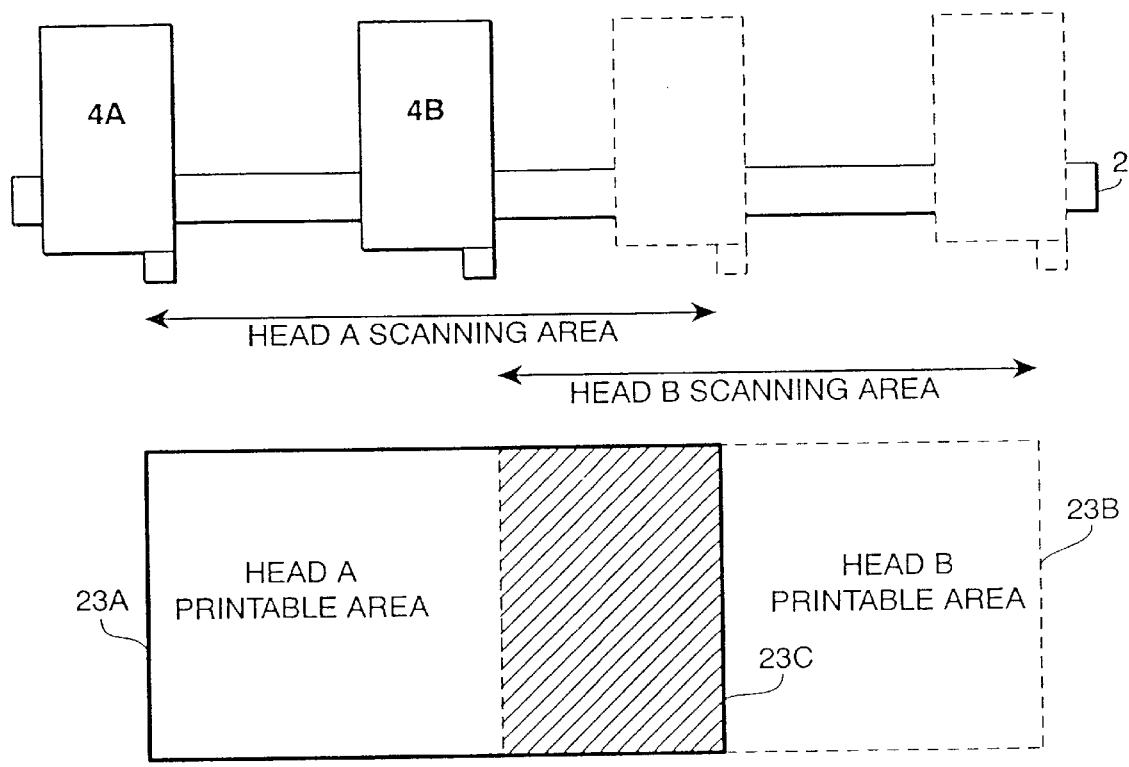
FIG. 4 illustrates divided scanning areas corresponding to each of two printheads.

As illustrated in FIG. 4, this preferred embodiment prints by scanning printheads 4A and 4B over divided and overlapping left and right print areas 23A and 23B, respectively. Area 23A, which is surrounded by a solid line in the Figure, is the printable area for printhead 4A, area 23B, which is surrounded by a broken line, is the printable area for printhead 4B, and shaded area 23C is an overlapped printing area in which both printheads 4A and 4B are able to print.

Figure 5:
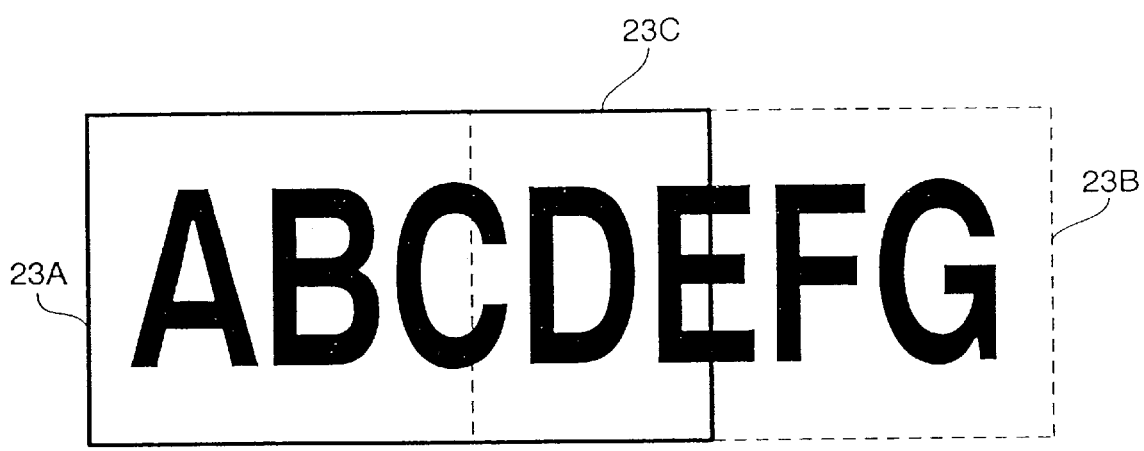
FIG. 5 shows an example of a printout in which a portion of an image exists in an overlapped printing area.

FIG. 5 shows an instance in which part of an image exists in overlapped printing area 23C of FIG. 4. FIG. 6A illustrates an example in which the image shown in FIG. 5 is printed by equally dividing the printing responsibilities between printheads 4A and 4B at the center of overlapped printing area 23C.

Using the division shown in FIG. 6A, FIG. 6B illustrates a printed image in a case where a density difference exists between printheads 4A and 4B. Similarly, FIG. 6C illustrates a printed image in a case where horizontal registration misalignment exists between printheads 4A and 4B.

As can be clearly seen in FIG. 6B and FIG. 6C, the quality of an image degrades in an overlapped printing area in cases where an image is printed by both left and right printheads 4A and 4B, the printheads having a density difference or a registration misalignment. As described above, a density difference appears in an image printed by left and right printheads 4A and 4B because of one of the following reasons: Difference in printing time, printhead temperature, or printhead density characteristics.

Figure 7:
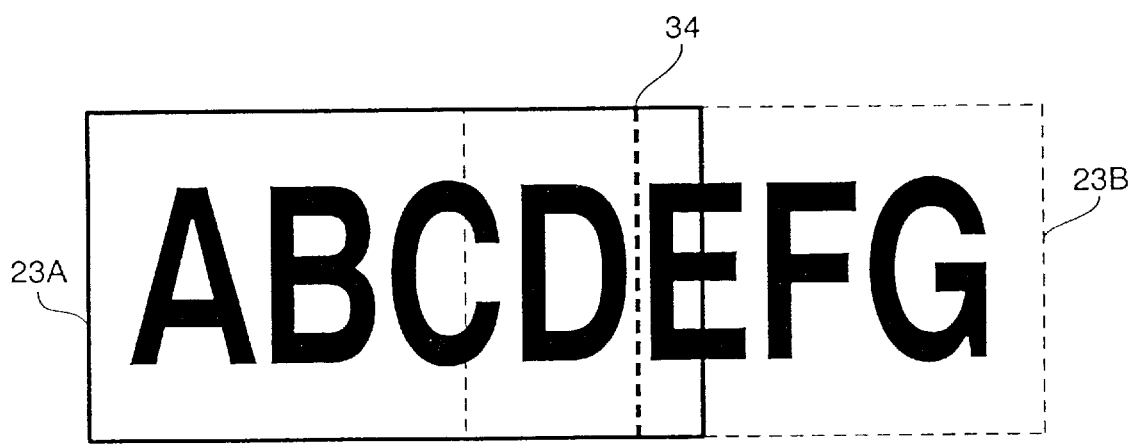
FIG. 7 illustrates an image printed by dividing image data at a column break.

In order to address the problems shown in FIG. 6 and described above, the technique described in the Laid-Open Patent Application No. 6-270488 alters division of a print area in accordance with the physical arrangement of image data to be printed. As illustrated in FIG. 7, this technique initially detects break 34, which runs in the column direction (the direction of a printing element array) of an image. Next, the technique alters the printing area divisions 23A and 23B for left and right printheads 4A and 4B in accordance with the location of break 34. In particular, area 23A is re-defined so as to extend rightward up to break 34 and area 23B is re-defined to extend leftward up to break 34. Because any discontinuities occur at an area having no image data, overall image quality degradation is lessened.

However, the technique described in Laid-Open Patent Application No. 6-270488 is capable only of detecting a break which runs perfectly straight in the column direction. Hence, the technique is unable to detect a break which is discontinuous in the column direction, such as break 35 of FIG. 8. In this case, the technique described in Laid-Open Patent Application No. 6-270488 would divide print areas through a character regardless of how the print areas are re-defined, and would be-unable to avoid noticeable image quality degradation.

Figure 8:
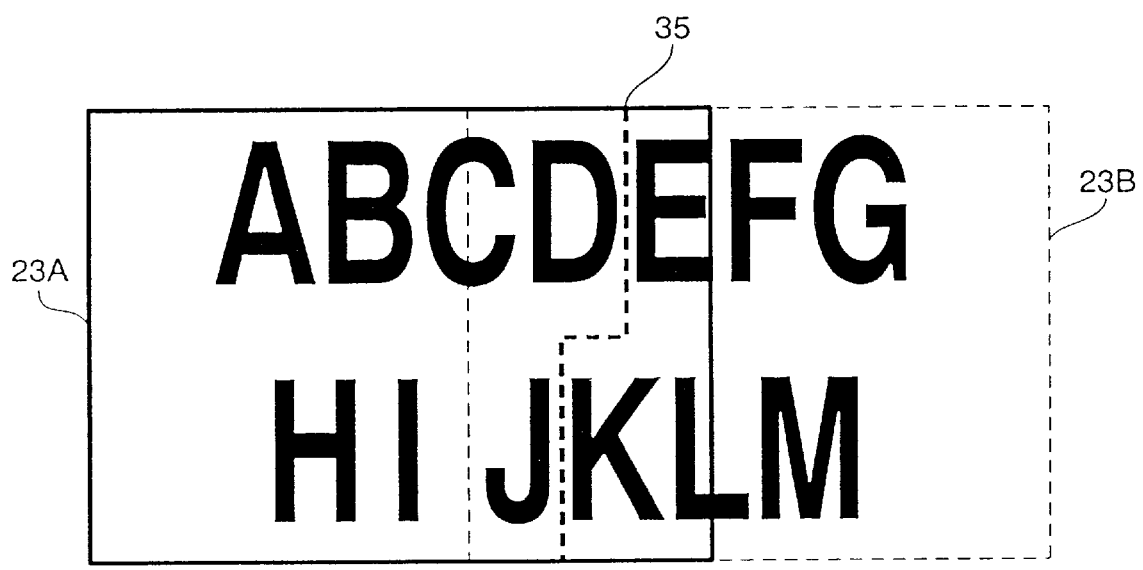
FIG. 8 illustrates an image printed by dividing image data at a discontinuous column break.

Advantageously, this preferred embodiment examines each data position in image data to be printed in an overlapped printing area using particularly-sized portions of the image data to detect a break position in the column direction within the overlapped printing area. Hence, even a discontinuous break can be discovered. For example, in FIG. 8, the preferred embodiment seeks a break position every ½ distance of the height of a printed band, or twice for each band. Therefore, a discontinuous break such as break 35 can be detected. Based on the position of the break 35, printhead 4A prints in re-defined printable area 23A, having break 35 as its rightmost border, and printhead 4B prints in re-defined printable area 23B, having break 35 as its leftmost border. Thus, each character shown in FIG. 8 is printed by only one of printheads 4A and 4B. Accordingly, image quality degradation is lessened even if a density difference or registration misalignment exists between left and right printheads 4A and 4B.

Figure 9:
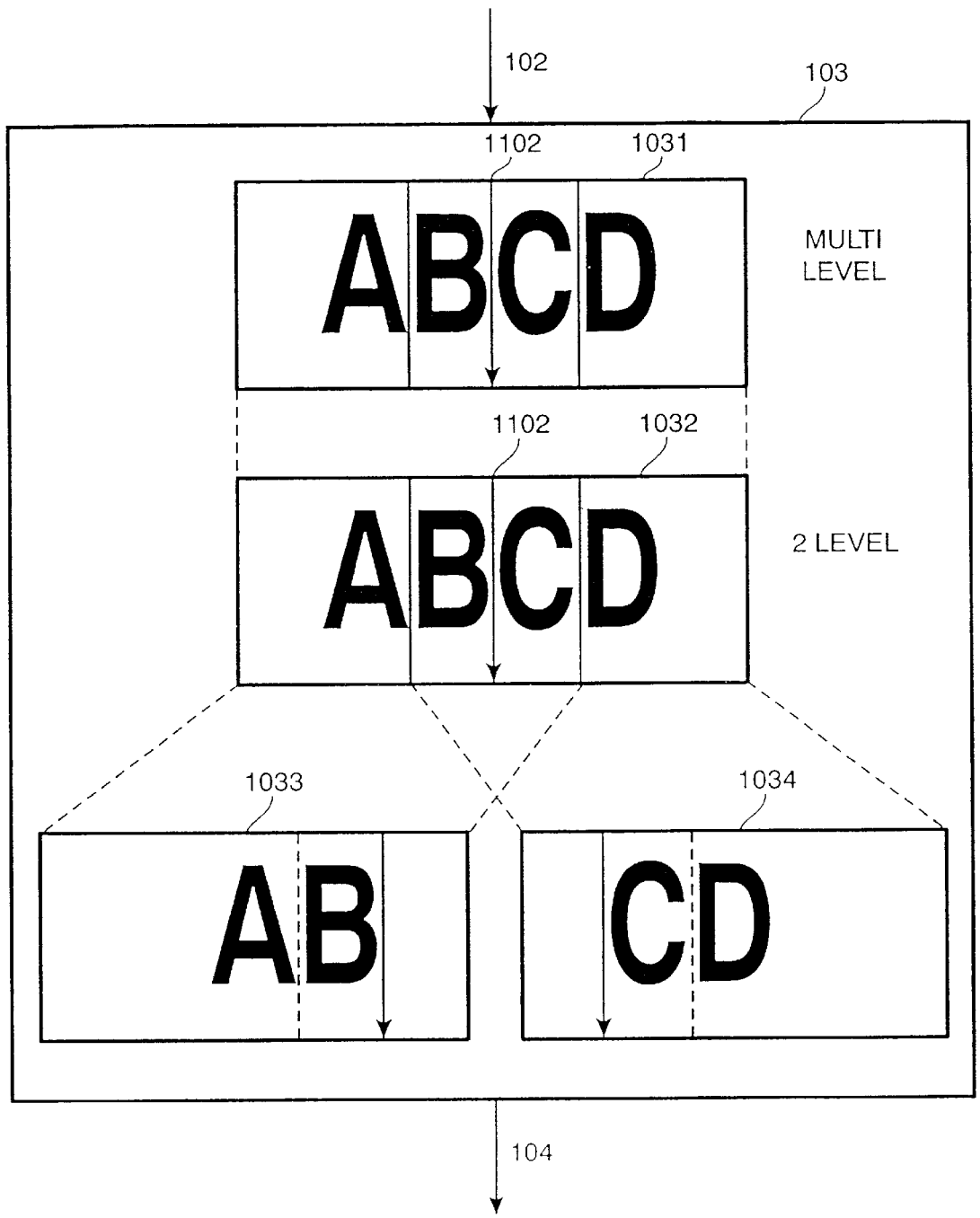
FIG. 9 illustrates image division performed by a printing system in accordance with the present invention.

In this preferred embodiment, the detection of a break position is performed by printer driver 103 contained in the host computer. FIG. 9 illustrates the process flow followed by printer driver 103. In particular, printer driver 103 receives multilevel data for one band from application software 102 and stores the data in a multiple-bit memory within the host computer. Next, printer driver 103 seeks a break at multiple locations in the data by following the flowchart shown in FIG. 10.

Figure 10:
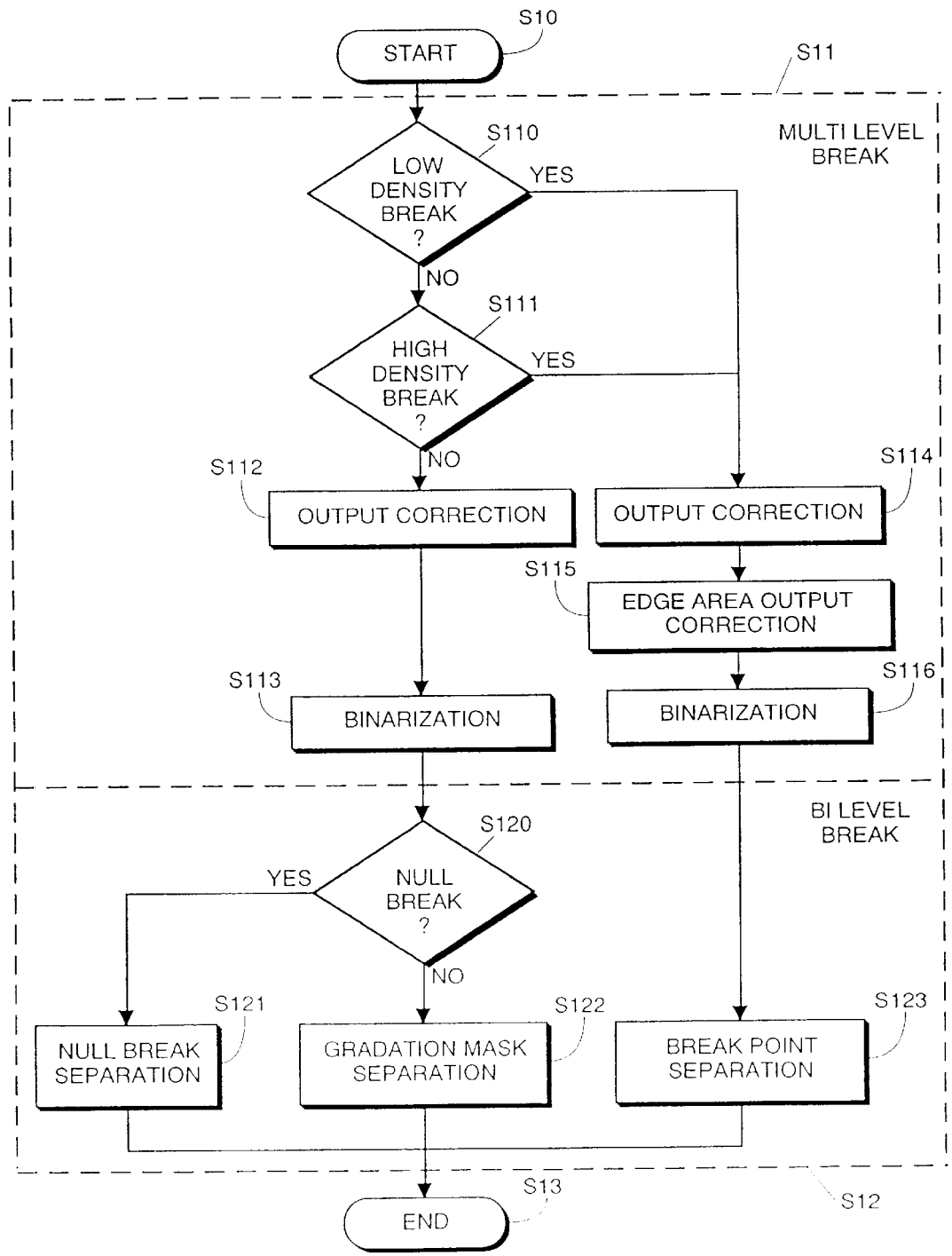
FIG. 10 is a flowchart for describing a break detection process according to the present invention.

As shown in FIG. 10, step S10 begins the column break detection process, and step S11 performs break detection upon multilevel data. If no break is found in step S11, step S12 performs a break detection at a binary level. Step S13 completes the process.

Figure 11:
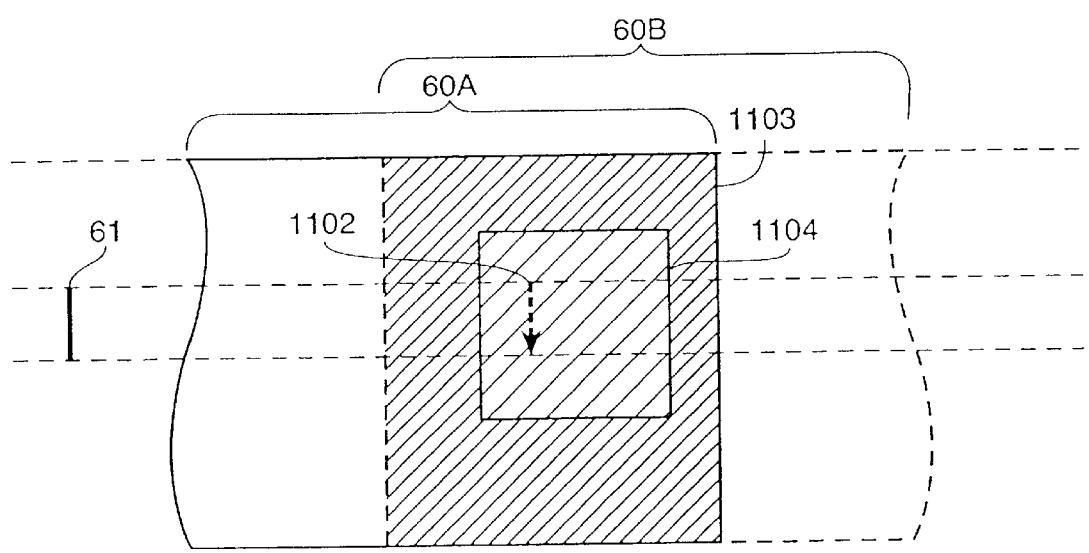
FIG. 11 illustrates multilevel low-density break detection according to the present invention.

Human visual characteristics are generally less keen to recognize printhead misalignment or density mismatches occurring at a boundary between regions printed using different printheads if the boundary is located in a low-density area of an output image. Accordingly, break detection is carried out in a low-density area in step S110. FIG. 11 illustrates such low-density break detection.

It is important to note that the density level of low-density areas discussed herein are not necessarily equal to 0 (0% duty). For example, a low-density area may be defined as an area containing print data having a 20% duty or below.

FIG. 11 shows left printable area 60A, right printable area 60B, printing width of printheads 4 (4A and 4B) 61, overlapped printing area 1103, low-density area 1104 within overlapped printing area 1103, and break position 1102 in low-density area 1104. Break position 1102 is defined as one which lies within the low-density area 1104.

Figure 12:
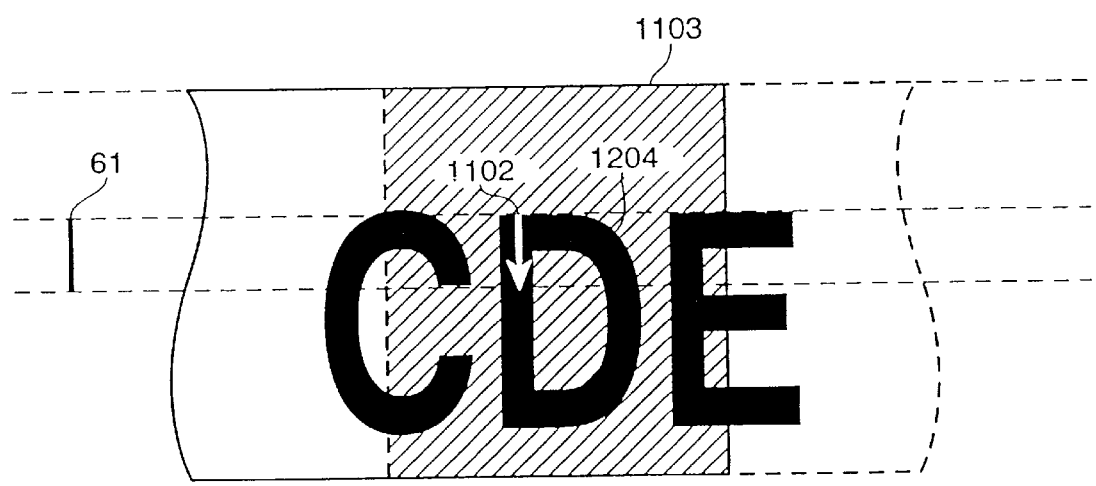
FIG. 12 illustrates multilevel high-density break detection according to the present invention.

If a low-density break is not found in step S110, step S111 performs high-density break detection. FIG. 12 illustrates high-density break detection. As is the case with lower-density areas, human visual characteristics are generally less keen to recognize printhead misalignment or density mismatch occurring at a boundary between regions printed using different printheads if the boundary is located in a high-density area of an output image. Accordingly, break detection is also carried out in a high-density area.

FIG. 12 shows high-density area 1204 within overlapped printing area 1103, and break position 1102 in high-density area 1204. Break position 1102 does not necessarily need to be the one shown in the figure as long as it lies within the high-density area 1204.

In step S114, the image in overlapped printing area 1103 is divided at detected break position 1102 to define areas for printing with left and right printheads 4A and 4B and output data is corrected according to the division. Furthermore, step S115 performs output corrections for the edge areas.

Alternatively, if it is not known how the image in overlapped printing area 1103 should be divided, flow arrives at step S112, and some appropriate output corrections are performed.

Then, step S113 or S116 performs binarization. The binarized data is stored in binary memory 1032 shown in FIG. 9. Binary memory 1032 (hereinafter referred to as "column buffer 1032") arranges data so that 8-bit bytes of data are stored in column direction rather than row direction. One of the advantages provided by column buffer 1032 is that binarized CMYK data subsequently sent to print buffer 24 does not need to undergo a horizontal-vertical conversion because the binary data is already arranged according to the physical orientation of the ink jet nozzles on printheads 4A and 4B.

Figure 13:
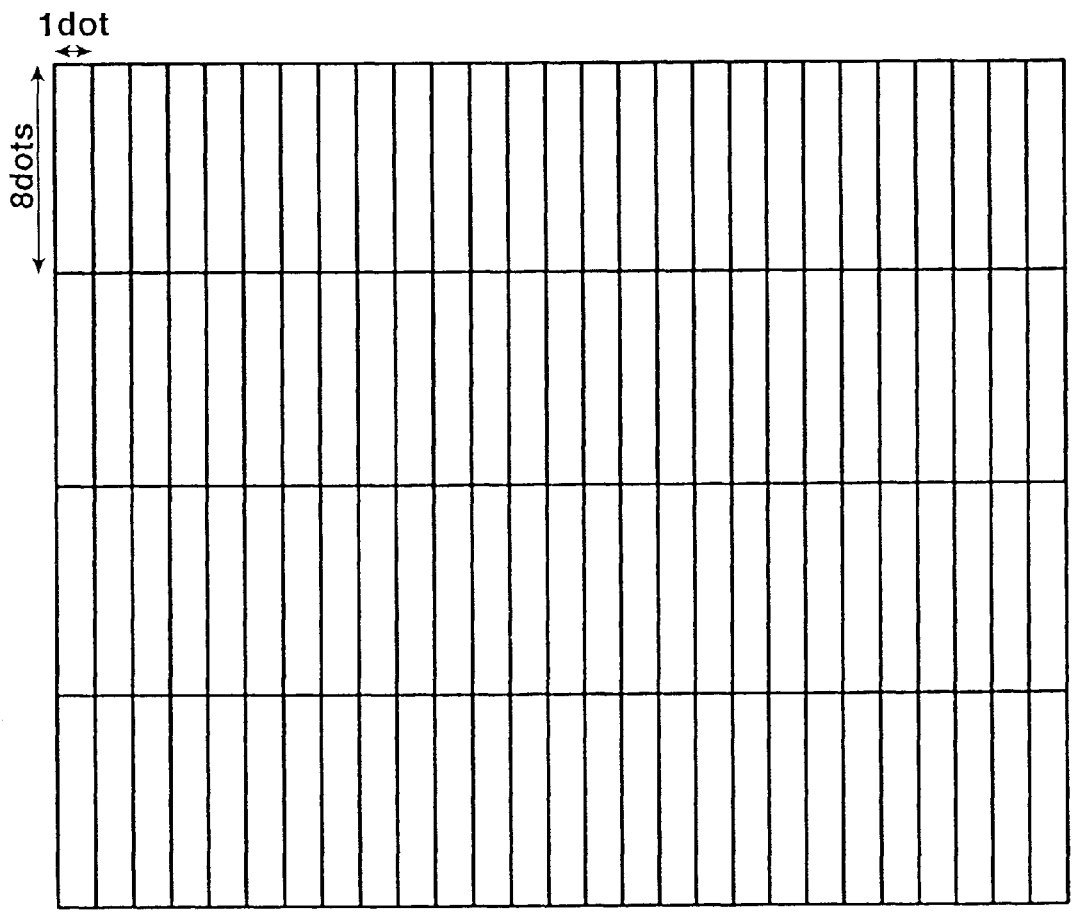
FIG. 13 illustrates a column buffer architecture.

Flow proceeds from step S113 to step S120, at which binary-level break detection is performed. Here, a null break of 8 dots (1 byte) is sought. The access unit of column buffer 1032, shown in FIG. 13, is 8 dots (1 byte). Accordingly, in order to determine whether any image data exists in consecutive 8 dots of a column, it is only necessary to determine whether the value of the corresponding byte is "0".

It should be understood that, even if a low-density break of multilevel data cannot be detected in step S11, a binary null break can be found in some instances. For example, a low-density break cannot be found in a multilevel area having constant image density higher than that defined as a low-density area. When the image data of such an area is binarized, most of the area turns into an image having no dot information. Hence, it thereafter becomes possible to find a null break in the area.

Figure 14:
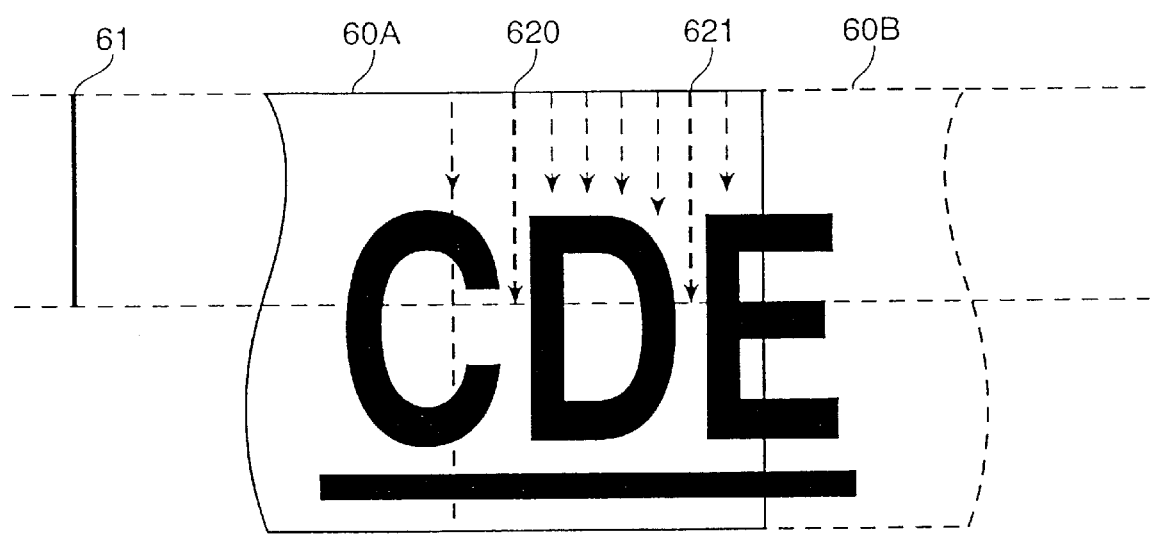
FIG. 14 illustrates binary level blank break detection according to the present invention.
Figure 15:
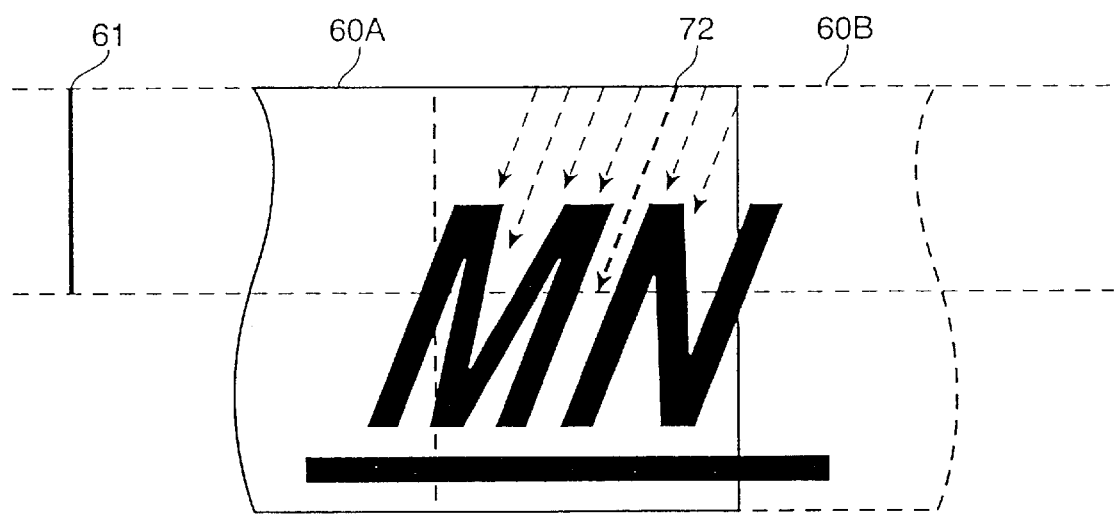
FIG. 15 illustrates binary level diagonal-blank break detection according to the present invention.

As illustrated in FIG. 14, binary-level break detection performed in step S120 can find break positions 620 and 621, where a break runs in the column direction. Binary-level break detection can also find break position 72, shown in FIG. 15, in which a break runs diagonally. Diagonal refers to a direction containing a horizontal direction (Y) element in addition to a vertical direction (X) element.

If step S120 detects a null break, step S121 divides the data in overlapped printing area 1103 into data 1033, to be printed on a left printable area exclusively by printhead 4A, and into data 1034, to be printed on a right printable area beginning at the position of the detected null break and using printhead 4B exclusively.

Figure 16:
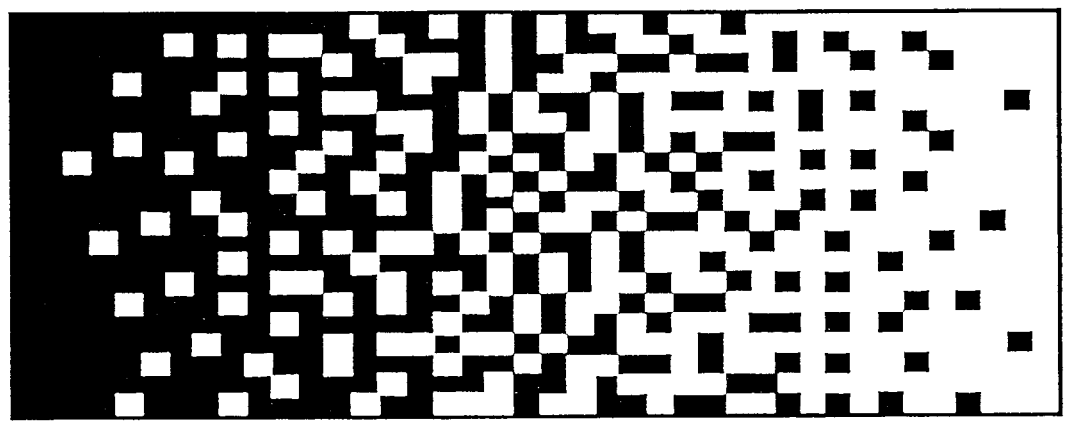
FIG. 16 shows a gradation mask pattern.

If step S120 does not detect a null break, step S122 divides the data within area 1103 using a gradation mask pattern which compensates for density differences or misalignments between printheads 4A and 4B, such as the mask illustrated in FIG. 16. White areas of the mask pattern are for left printhead 4A and the black areas for right printhead 4B. Application of a mask such as this helps suppress image quality degradation at a printing boundary within overlapped area 1103 to some extent.

Figure 17:
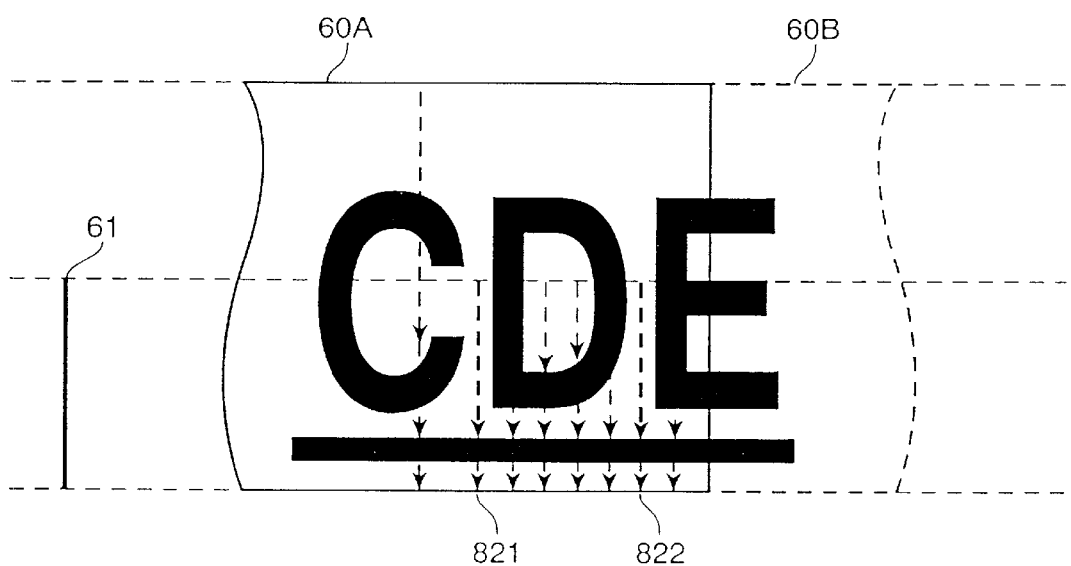
FIG. 17 illustrates-binary level minimum-dot break detection according to the present invention.

Alternatively, in a case where a null break is not found in step S120, an image may be divided at a column position at which a number of dots is at a minimum, rather than using a gradation mask pattern. Such column positions are denoted in FIG. 17 by numerals 821 and 822. In this case as well, image quality degradation at a printing boundary within overlapped area 1103 can be suppressed to a degree.

As a further alternative, instead of performing a first step of null break detection and a second step of detection of a column having a minimum dot number, a single step can be used to detect a break position at a column having a dot number less than a certain value. Such a single step would, of course, also locate columns having zero dots (a null break). This single step detection also decreases detection time in comparison to the two-step detection.

Step S116 flows to step S123, which divides binary data in overlapped printing area 1103 into binary data 1033, to be printed on a left printable area exclusively by printhead 4A, and into data 1034, to be printed on a right printable area beginning at the position of the previously-detected multi-level break and using printhead 4B exclusively. The divided binary data for the printable areas is sent to controller software 104 in the printing device, and the left and right printheads 4A and 4B subsequently print the data.

The low-density break detection performed in step S110 is explained in detail below with reference to the flowchart of FIG. 18.

Flow begins at step S20. Step S21 initializes the process, step S22 detects a break position, step S23 stores the detection results, and step S24 completes the process.

Figure 18:
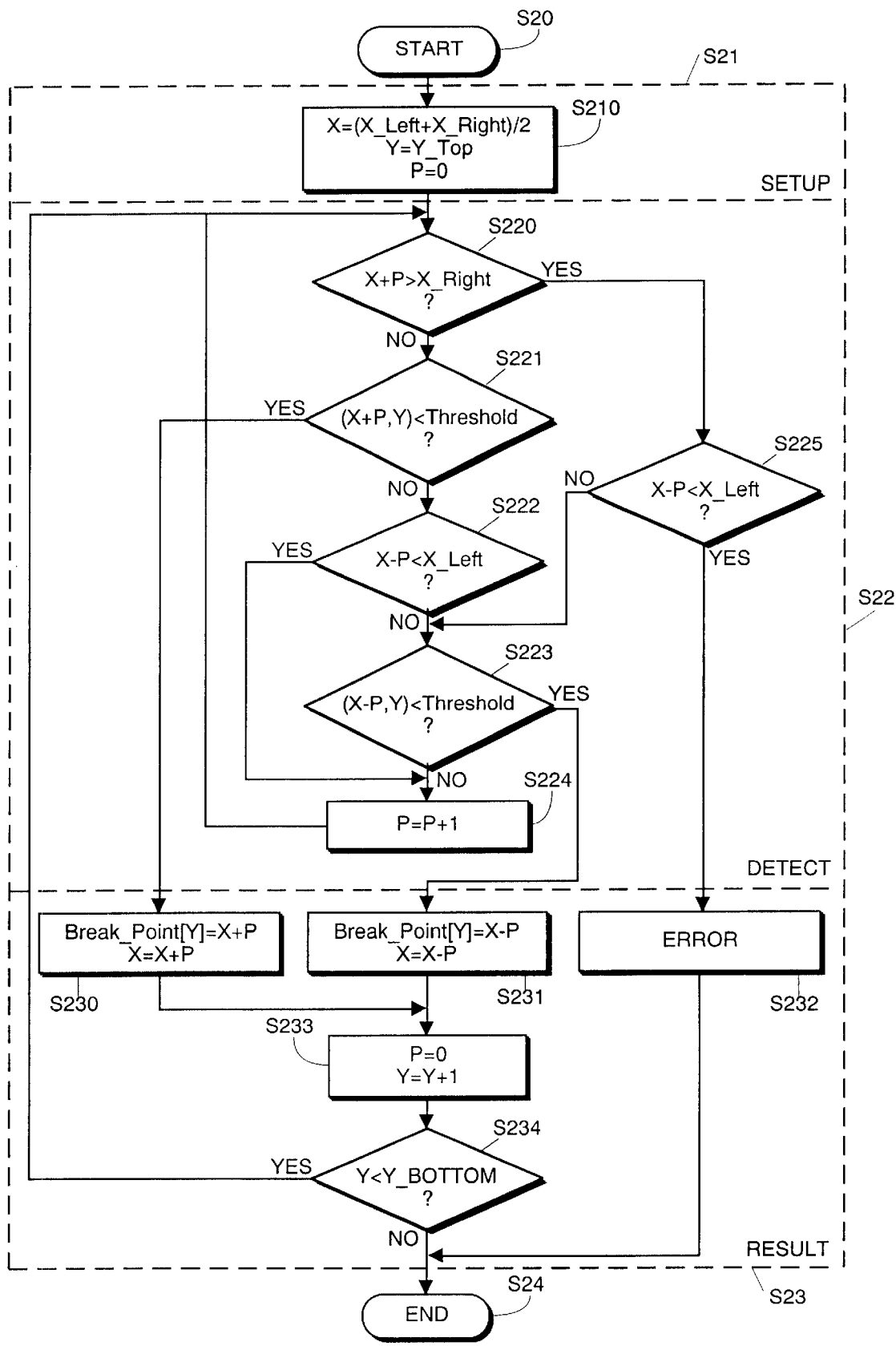
FIG. 18 is a flowchart of a low-density break detection process according to the present invention.
Figure 19:
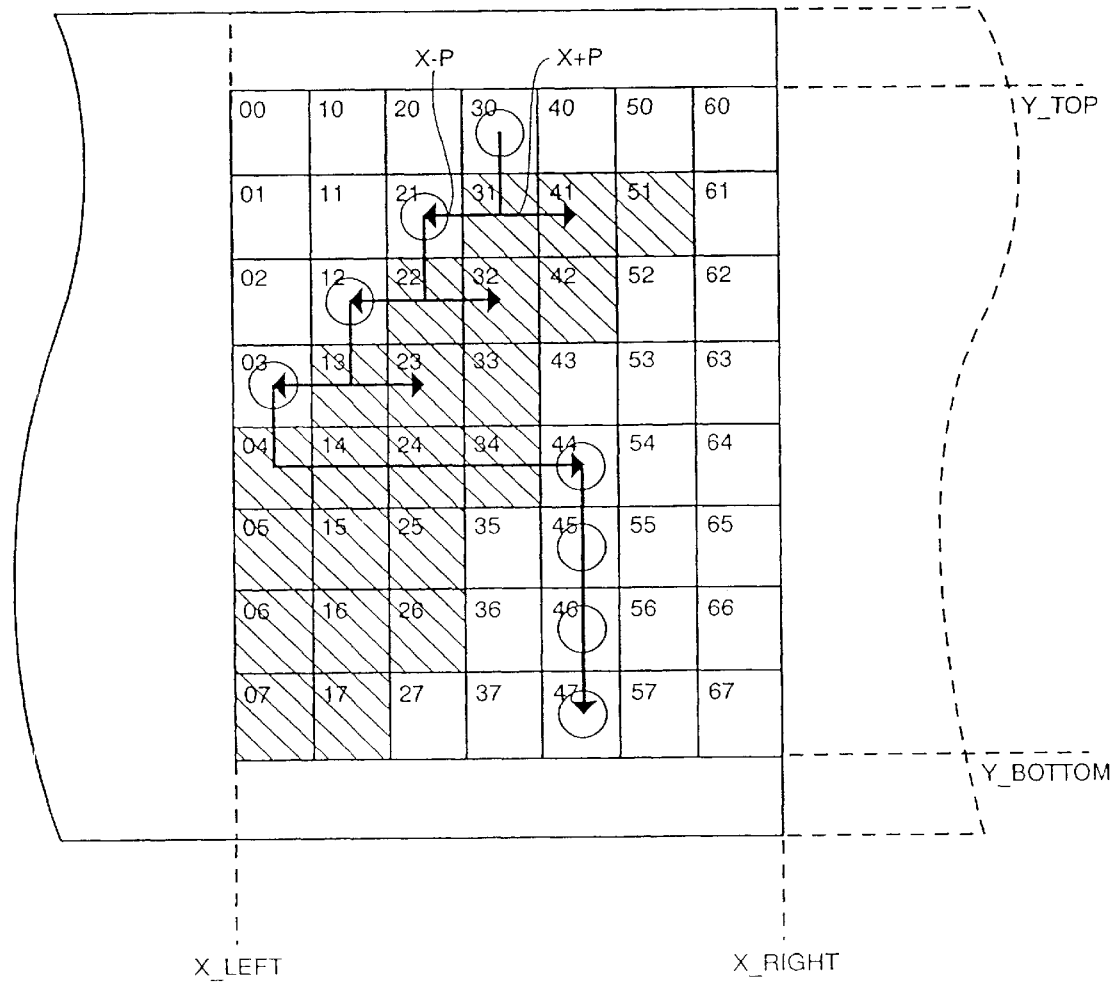
FIG. 19 is a magnified view of an image which illustrates low-density break detection according to the present invention.

FIG. 19 illustrates image data within an overlapped printing area which is stored in a multiple-bit memory and to which the process of FIG. 18 can be applied. X_Left, X_Right, Y_Top, and Y_Bottom represent a left, right, upper and lower edge of the overlapped scanning area, respectively. Step S210 of step S21 defines a break detection start position at the middle of the overlapped scanning area ((X_Left+X_Right)/2) for the X (scanning) direction, and at the top edge (Y_Top) of the overlapped scanning area for the Y (column) direction. Parameter "P" is used to vary the position of the break detection. Initially, "P" is set to "0". In this example, image data is processed in blocks, with the subject image data having 7 blocks in the X direction and 8 blocks in the Y direction. Each block consists of 8 dots×8 dots and each dot is represented by 8 bits.

Step S220 determines whether or not the right side of the detection position (X+P) in the X direction is beyond the right edge (X_Right) of the overlapped scanning area. If the right side of the detection position is not beyond the right edge of the overlapped scanning area, step S221 determines whether or not the value of the image data at the detection position (X+P, Y) is less than a certain threshold to determine whether or not the detection position is a low-density break position. Here, the value of image data at block (X, Y) is equal to a duty of a block which is 8 dots wide in both X and Y directions, and the threshold is 20%. If the value is more than the threshold, the detection position is not a low-density break position, and flow proceeds to step S222.

At step S222, it is determined whether or not the left side of the detection position (X−P) in the X direction is beyond the left edge. (X_Left) of the overlapped scanning area. If the left side of the detection position is not beyond the left edge of the overlapped scanning area, step S223 determines whether or not the value of the image A data at the detection position (X−P, Y) is less than a certain threshold in order to determine whether or not the detection position is a low-density break position. If the value is greater than the threshold, the detection position is not a low-density break position, and flow proceeds to step S224.

At step S224, P is incremented and the process returns to step S220 to continue the low-density break position detection for the-same Y position.

If step S220, at any time during processing, shows that the right side of the detection position X+P is beyond the right edge X_Right of the overlapped scanning area, step S225 then determines whether or not the left side of the detection position X−P is beyond the left edge X_Left of the overlapped scanning area. If the left side of the detection position is not beyond the left edge of the overlapped scanning area, the process proceeds to step S223. Alternatively, if the left side of the detection position is beyond the left edge of the overlapped scanning area, then a break has not been found for the Y position being investigated and the process proceeds to step S232 for an error process. This error process results in progression from step S110 in FIG. 10 to step S111.

If, in step S221, the value of the detection position is less than the threshold and therefore the detection position represents a break position, step S230 stores X+P as a break position Break_Point in the X direction corresponding to the subject Y position. Then, the initial value of the detection position in the X direction for the next Y position is set to X+P.

Step S233 brings "P" back to "0", and increments the detection position in Y direction for the detection of the next break in the Y direction. Step S234 determines whether or not the detection position in the Y direction is below the lower edge of the overlapped printing area. If it is not below the lower edge, flow returns to step S220 and break detection is continued. Otherwise, the break detection process is completed. In the latter case, the detected break position information is stored as Break_Point.

A specific example of the break detection flowchart of FIG. 18 is described below, with reference to FIG. 19. In FIG. 19, the blank boxes are low-density areas, and the shaded boxes are medium or high-density areas.

Initialization in step S210 sets X to 3, Y to 0 and P to 0. Accordingly, detection point (X+P, Y) becomes (3, 0). The value at (3, 0) represents a low-density area and the result in step S221 is therefore affirmative. Next, in step S230, the break position information is stored in the form Break_Point[0] =3. X is also re-initialized to 3. Y is then incremented by 1 in step S233.

Returning to step S220, (X+P, Y) becomes (3, 1). The value at position (3, 1) does not represent a low-density area and step S221 therefore results in a negative determination. (X−P, Y) is also (3, 1), therefore step S223 also results in a negative determination. Next, in step S224, P is incremented by 1.

Upon returning to step S221, (X+P, Y) is (4, 1) and a break is not found at this position. Flow advances through step S222 to step S223, in which (X−P, Y) is (2, 1) and (X−P, Y) is less than the threshold. Accordingly, this break position information is stored in step S231 in the form Break_Point [1]=2. X is also re-initialized to 2. Next, in step S233, Y is incremented to 2 and P returns to 0.

Flow then proceeds in a similar manner so as to locate breaks at positions (1, 2) and (0, 3).

When Y has reached a value of 4, no break is located at positions (0, 4), (1, 4), (2, 4), and (3, 4) but a break is located at (4, 4). A break is not sought in the area to the left of where X is 0 because the area is outside of the overlapped printing area and step S222 therefore gives an affirmative response and causes flow to skip step S223. Subsequently, breaks are found at (4, 5), (4, 6), and (4, 7), and the process in FIG. 18 is completed.

A multilevel image in the overlapped printing area is divided at the detected break positions shown in FIG. 19 into left and right printable areas. Specifically, portions of the FIG. 19 image having Y values of 0 to 3 are printed in the right printable area by printhead 4B, and other portions having Y values of 4 to 7 are printed in the left printable area by printhead 4A. In this case, however, a discontinuity may appear at the boundary between row 3, pixels 1 to 3 and row 4, pixels 1 to 3. In order to eliminate the discontinuity, step S115 in FIG. 10 performs output corrections.

Due to the foregoing discontinuity, a break position at (6,0), . . . , (6,7) is most desirable for the FIG. 19 image because dividing printable areas along such a break would-make a discontinuity at a boundary between the two areas less visible. Hence, instead of the break detection method shown in FIG. 18, a method may be used in which all of break positions are examined and in which the break position having continuous break detection positions is chosen. This method places priority on image quality.

In contrast, the break detection method shown in FIG. 18 utilizes a break position which is found first to divide printable areas. Hence, the FIG. 18 method places priority on speed. A system can be designed in which an operator can choose which method to use or in which one of the methods is chosen automatically, depending on the printing mode (high image quality mode, high speed mode).

This preferred embodiment detects a break position in terms of blocks (8 dots×8 dots). However, a break position can also be determined by applying the above-described process dot-by-dot. In the latter case, more comparisons are performed and detection is more time-consuming. On the other hand, the likelihood of successful break detection increases.

Moreover, in the above-described process, the horizontal length of the overlapped printing area is defined to be 7 blocks, or 56 dots, long. If the length is increased, the detection area becomes larger and the chance of a successful detection becomes higher. On the contrary, if the length is decreased, the overlapped area becomes narrower and detection time becomes shorter. In a printing device of this preferred embodiment, or when printing is performed on A3-sized print media, an overlap of 40 to 50 blocks (320 to 400 dots) is desirable for good detection success and printing speed.

The above explanations assume that the resolution of the image data from application software 102 and that of printheads 4A and 4B of the printing device are equal (360 dpi). However, some application software 102 may create image data with a different resolution from that of a printhead. In such a case, printer driver 103 usually performs resolution conversion. For example, when application software 102 creates image data of 72 dpi, printer driver 103 converts it to image data with a five-fold resolution or 360 dpi.

For such a case, this preferred embodiment performs multilevel break detection dot-by-dot. Even though the embodiment detects a break dot-by-dot, the total number of examinations is not a large amount because the resolution is one fifth of 360 dpi. On the other hand, a duty calculation, which is necessary when the detection is performed block-by-block, is not necessary for dot-by-dot detection, therefore the time required for calculations decreases.

Once breaks are found, resolution conversion is performed, for example, prior to or after the output correction process (steps S112 and S114). If the resolution conversion is performed prior to the output correction process, more accurate output corrections can be performed. If the resolution conversion is performed after the output correction process, the time required for the correction process decreases.

High-density break detection, performed in step S111 of FIG. 10, is similar to the low-density break detection process of FIG. 18. In particular, high-density break detection is performed by reversing the less-than symbols in steps S221 and S223 to greater-than symbols, and by using a threshold value of 80%.

The binary-level null break detection of step S120 is explained in detail below with reference to the flowchart of FIG. 20.

Figure 20:
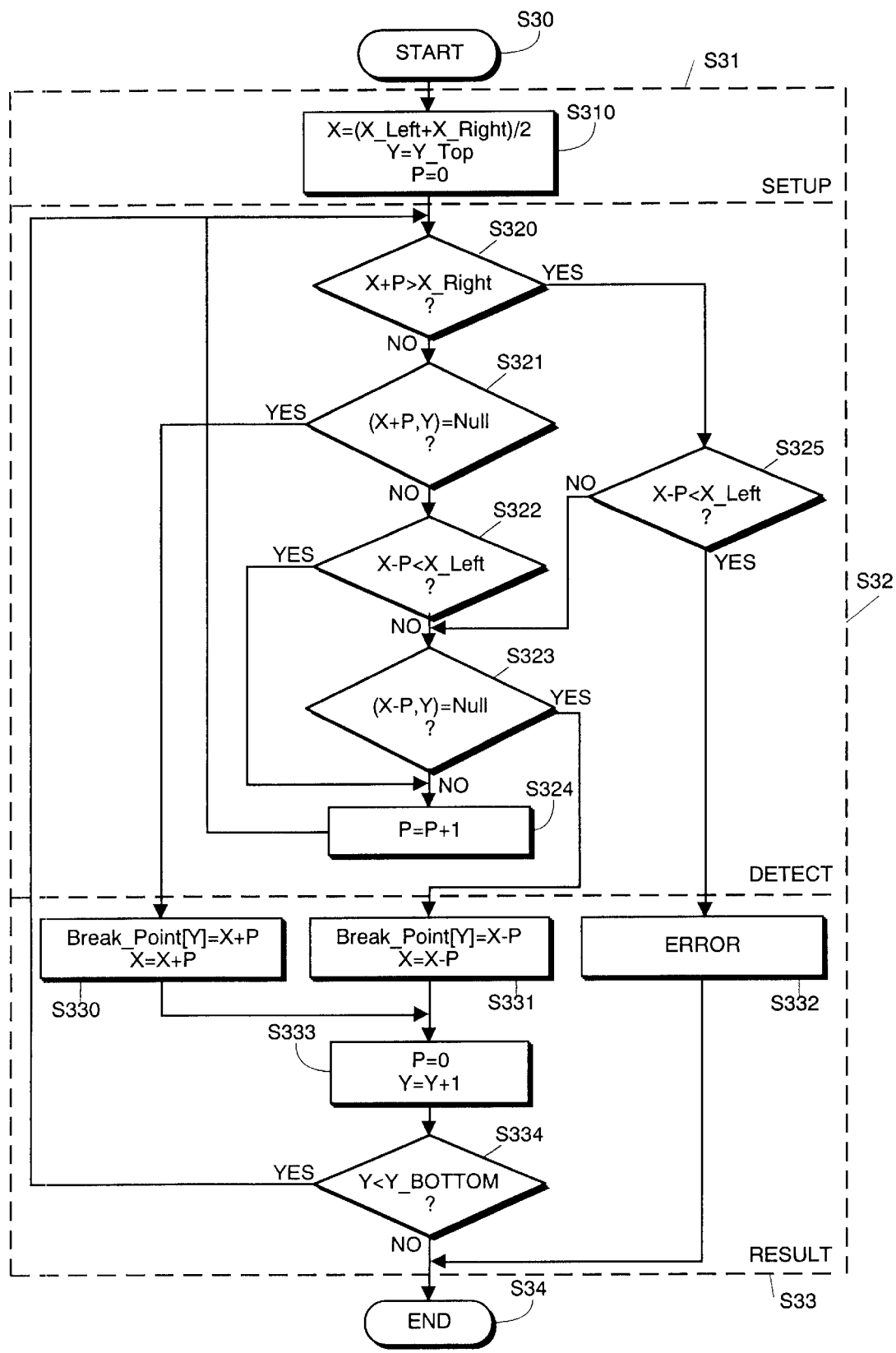
FIG. 20 is a flowchart of a blank break detection process according to the present invention.

As shown in FIG. 20, flow starts with step S30. Step S31 initializes the process, step S32 detects a break position, step S33 stores the detection results, and step S34 completes the process. It is to be understood that the FIG. 20 flowchart is similar to that shown in FIG. 18. The steps in FIG. 20 which are the same as those shown in FIG. 18 are therefore omitted from the foregoing explanation.

Figure 21:
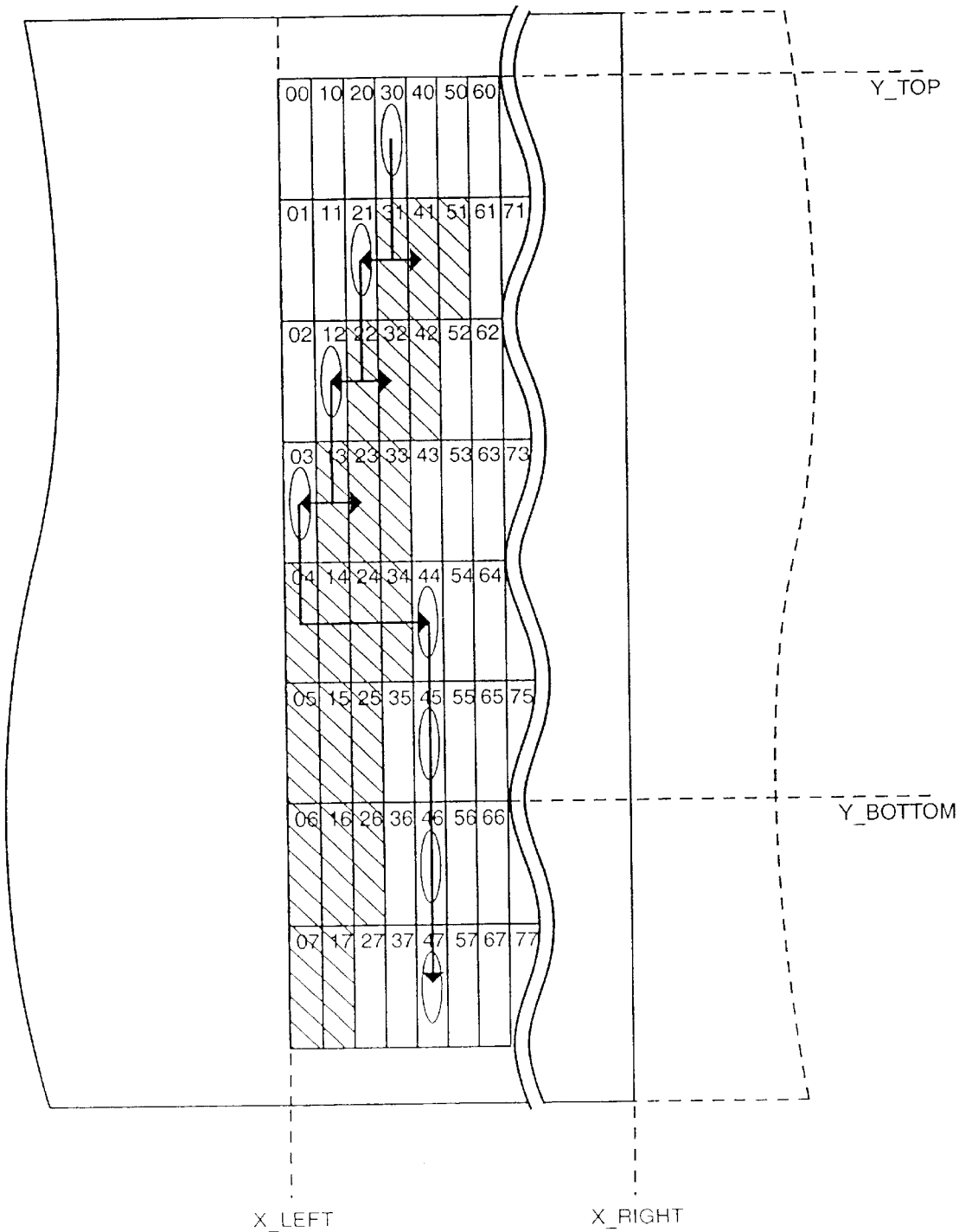
FIG. 21 is a magnified view of an image which illustrates blank break detection according to the present invention.

FIG. 21 illustrates an example of image data of an overlapped scanning area which is stored in a binary column buffer. X_Left, X_Right, Y_Top, and Y_Bottom represent a left, right, upper and lower edge of the overlapped scanning area, respectively. Step S310 of step S31 defines an X-coordinate of a break detection start position at the middle of the overlapped scanning area ((X_Left +X_Right)/2)), and defines a corresponding Y-coordinate at the top edge (Y_Top) of the overlapped scanning area. For convenience sake, this example divides image data into 7 dots in the X direction and into 8 one-by-eight blocks in the Y direction. Each block consists of 1 byte (8 bits) and corresponds to the image data for 8 dots.

Step S321 determines whether or not the image data at the detection position (X+P, Y) has a null value in order to determine whether the position represents a blank break. It should be noted that, even if one dot exists in the block at (X+P, Y), the value will not be null and hence, the position will not be identified as a blank break. Similarly, it is determined in step S323 whether the value of image data at detection position (X−P, Y) is null.

If, in step S320, it is determined that the right side of the detection position X+P is beyond the right edge X_Right of the overlapped scanning area, then step S325 determines whether or not the left side of the detection position X−P is beyond the left edge X_Left of the overlapped scanning area. If, at this point, the left side of the detection position is determined to be beyond the left edge of the overlapped scanning area, no break has been found for the subject Y position and the process proceeds to step S332 to conduct an error process. This error process results in progression from step S110 in FIG. 10 to step S111.

FIG. 21 illustrates an example of the break detection process of the FIG. 18 flowchart. This example is similar to the one in FIG. 19, therefore its explanation is omitted. In FIG. 21, the blank boxes represent blank (null) areas, and shaded boxes represent areas in which dots are present.

As described above with respect to FIG. 19, a break position (6, 0), . . . , (6, 7) is the most desirable for improving the image quality of the FIG. 21 image because discontinuities due to printhead output density differences or misalignment will not cross through image data. Accordingly, as described above, a method may be used in which all break detection patterns are examined and in which one with a continuous break detection position is chosen. This method places priority on image quality.

In contrast, the break detection method shown in FIG. 20 employs a break position which is found first. Hence, the FIG. 20 method provides inferior image quality to the method which places priority on image quality, but its detection speed is faster. A system can be designed which allows an operator to choose either of the two methods or, alternatively, a system may be designed to choose one method automatically, depending on the printing mode (high image quality mode, high speed mode).

This preferred embodiment detects a break position block (1 dot×8 dots) by block. However, a break position can also be detected by examining an overlapped printing area dot-by-dot. In the latter case, the flow of steps S32 and S33 must be repeated more often than in a block-by-block examination. Therefore, break point detection takes longer to compete. However, dot-by-dot examination increases the possibility of achieving successful break detection.

In the above example, described utilizing FIG. 20 and FIG. 21, the length of horizontal overlap in the overlapped printing area is defined to be 7 dots. If the length is increased, the detection area becomes larger and the chance of successful detection becomes higher. On the contrary, if the length is decreased, the overlapped area becomes narrower and the detection time becomes shorter. In a printing device of this preferred embodiment, or when printing is performed on A3-sized print media, an overlap of 360 dots is desirable for good detection success and printing speed.

This preferred embodiment utilizes a column buffer which accesses data column by column. Such a buffer simplifies break detection in the column direction because column data is in an easy-to-access form. It is also possible to use a conventional raster buffer which stores data raster by raster when practicing the present invention.

As described above, this preferred embodiment detects a break position within an overlapped area using at least one of a plurality of break detection systems on image data to be printed within the overlapped printing area. Based on the detected break position, the image data for the overlapped printing area is selectively divided into multiple printable areas, and the printable areas, including the overlapped printing area, are printed based on the divided image data. Therefore, even if there is a registration misalignment among the printheads in a design in which multiple printheads print on a common medium, image quality degradation due to a vertical or horizontal deviation in the image printed by the left and right printheads is reduced. Furthermore, even if a density difference appears due to a difference in printing timing, temperature, or density characteristics of the left and right printheads, image quality degradation due to such reasons is reduced.

This preferred embodiment also provides high probability of break detection in an image which does not consist of simple characters and in which when continuous breaks in a column direction do not exist. This advantage is obtained because break positions in the image data are sought multiple times every certain unit of data (byte by byte).

Furthermore, and as described above, human visual characteristics less clearly recognize printhead misplacement or density mismatch at a boundary between-two print areas when the boundary is placed in a low or high-density area. Taking this visual characteristic into consideration, the present invention seeks break positions (boundaries) in multilevel image data in a low or high-density area. Therefore, it is possible to perform break detection of multilevel image data. The preferred embodiment has an advantage in that a density correction process on multilevel data can be subsequently performed because image data is divided between printable areas of multilevel data.

(The Second Preferred Embodiment)

This preferred embodiment prevents overheating of printheads in a general serial printing device. In such a device, printing is interrupted in the middle of scanning in order to protect a printhead when an abnormal increase in temperature is observed on the printhead. Printing is restarted from where it is interrupted after the printhead temperature reduces to a certain level or after a certain predetermined amount of time passes. Such stopping and restarting control is known in the art and a detailed explanation thereof is omitted.

In the above situation, an image density discontinuity occurs at the position at which printing stops and restarts due to the temperature difference of a printhead when printing on one side of the interrupted location and the other. In addition, a discontinuity may also appear in the direction of a printing element array because the printhead alignment has shifted upon printing restart.

Figure 22:
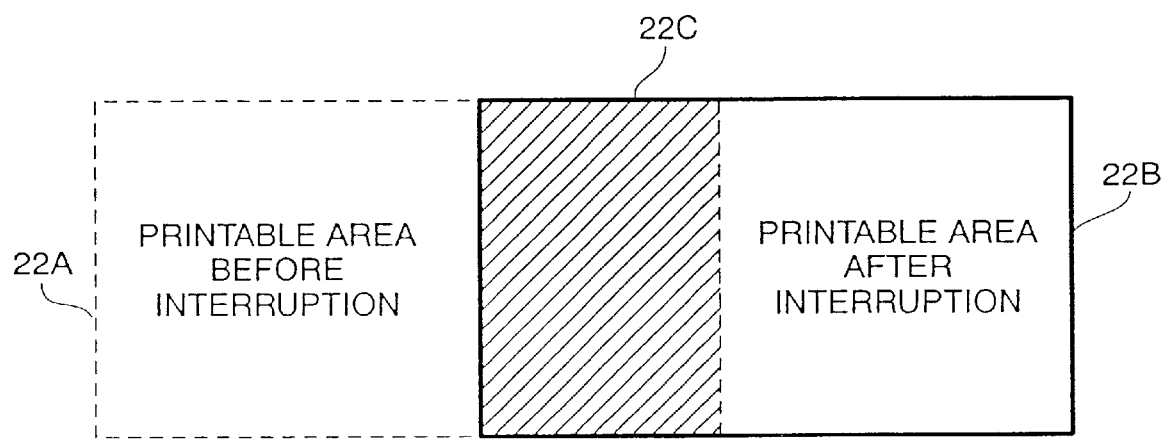
FIG. 22 illustrates image areas corresponding to printing interruption.

FIG. 22 illustrates a method for addressing the foregoing problems in accordance with the present invention. Printable area 22A, in which image data is printed prior to a printing interruption, and printable area 22B, in which image data is printed after printing is restarted, overlap partially at the overlapped printing area 22C. Using the method explained in the first preferred embodiment, a break position is detected in the image data to be printed within overlapped printing area 22C. Based on the detected break position, the image data for the overlapped printing area 22C is divided between the printable areas 22A and 22B for printing either before or after interruption.

As a result of the foregoing, even if a registration misalignment exists upon printing restart after a print interruption, image quality degradation is reduced. Furthermore, even if a band printed by left and right printheads 4A and 4B contains a density difference at a printing stop/restart boundary due to a difference in printing timing or a temperature difference, image quality degradation due to such reasons is reduced. In addition, this preferred embodiment provides the same benefits as the those described with respect to the first preferred embodiment.

(The Third Preferred Embodiment)

This preferred embodiment contemplates a general serial printing device in which an electric power supply with a limited capacity is used. Such a power supply is often used in order to reduce the cost of a printing device. According to this preferred embodiment, a power supply with a limited supply allows all printing elements to be used simultaneously when printing an image having a low overall duty, such as a text-based image. On the contrary, such a power supply cannot provide power so as to allow all printing elements to be used simultaneously when an image to be printed has a high duty, as in the case of a picture image.

For such a high duty image, a band to be printed by all printing elements is divided in order to reduce the power consumption during one scanning path. For example, half of the printing elements are used at per scan and two scans completes printing of the band. This control is a known technology and a detailed explanation is therefore omitted.

However, this band-splitting technique often causes a discontinuity to appear between the half-bands printed during the two scans.

Figure 23:
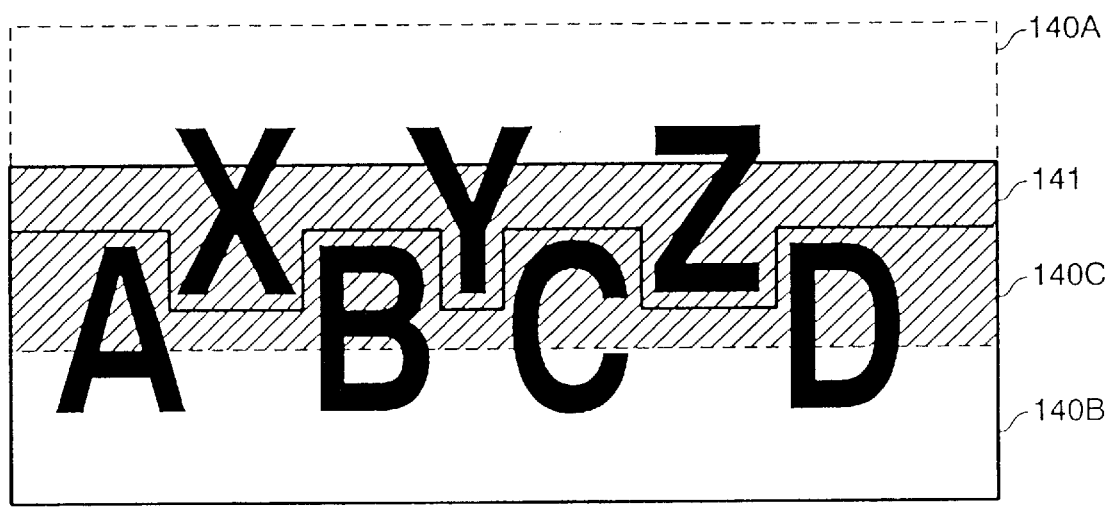
FIG. 23 illustrates a non-continuous raster break according to the present invention.

As illustrated in FIG. 23, this preferred embodiment provides bands 140A and 140B, which overlap on overlapped printing area 140C. As described above, bands 140A and 140B are printed during two respective scans. In other words, the width (in this example, 64 nozzles) of a printhead is divided into an upper 62.5% (40 nozzles) for printing during a first scan and a lower 62.5% for printing during a second scan. As a result the overlapped printing area is printed using a common 25% of the printhead (16 nozzles).

According to the present embodiment, break position 141 is detected within the image data in overlapped printing area 140C. Based on detected break position 141, the image data within the overlapped printing area 140C is divided between printable areas 140A and 140B so as to be separately printed by either the upper or lower half of the printhead.

The detection method of the break position in this preferred embodiment is similar in principle to that of the first preferred embodiment, except that break position detection is performed in the raster direction. The flowcharts of FIG. 10, FIG. 18, and FIG. 20 may all be employed for such detection, excepting that the X and Y-coordinate designations should be reversed. Therefore, as described above, a break position in the image data to be printed within overlapped printing area 140C is detected by detecting several break points, each corresponding to a separation of images in the raster direction.

Therefore, even if a density difference due to a difference in printing timing or temperature appears at the boundary resulting from the two scans, image quality degradation due to such reasons is reduced. This advantage is experienced because the image near the boundary in the band is divided across a break position.

Notably, this preferred embodiment provides a high probability of break detection even when an image does not consist of simple characters and when a continuous break does not exist within the image in the raster direction because a break position in the image data is sought byte-by-byte for each separation of image data.

Furthermore, human visual characteristics less keenly recognize printhead misplacement or density mismatch at a boundary between separately-printed areas when the boundary exists in a low or high-density area. Accordingly, a break position in multilevel image data is sought in a low or high-density area. The preferred embodiment has an advantage in that a density correction process can be performed on multilevel data because multilevel image data is divided. In addition, this preferred embodiment provides similar benefits as those described above with respect to the first preferred embodiment.

The first preferred embodiment detects breaks in a column direction and, accordingly, the disclosed image data memory is structured to store image data in column format. However, as the presently-described embodiment detects breaks in the raster direction, it is desirable to utilize a conventional raster buffer for easier data access in this preferred embodiment.
(The Fourth Preferred Embodiment)

The fourth preferred embodiment reduces banding which appears at a boundary between two bands in a generic serial printer.

For the foregoing explanation, overlapped area 140C in FIG. 23 is deemed to have a 16-dot length in the column direction. 64-dot-wide bands 140A and 140B are printed during two separate scans. From the image data to be printed within overlapped printing area 140C, break position 141 is detected. Based on detected break position 141, the image data for the overlapped printing area 140C is divided into printable areas 140A and 140B so that each character therein is entire contained within one of printable areas 140A and 140B. The detection of a break position in this preferred embodiment is similar to that described with respect to the third preferred embodiment. Hence, its explanation is omitted.

This preferred embodiment allows a generic serial printer to reduce banding which appears due to fluctuations in the distance that a print media is advanced between scans and due to smearing of ink at edges of bands, as is commonly experienced in the case of the ink jet method. In addition, even if a density difference occurs between adjacent bands due to a difference in printing timing of bands or in temperature of a printhead, degradation of image quality because of these reasons is reduced. This reduction in degradation of image quality occurs because the image around the boundary of bands is divided at the break position as described above. Furthermore, this preferred embodiment provides similar benefits as those described with respect to the third preferred embodiment.
(The Fifth Preferred Embodiment)

This preferred embodiment is intended to reduce degradation of image quality due to a slight misalignment of printing locations between opposite scans during dual-directional printing of a serial printer. In addition, this preferred embodiment is intended to solve the above-mentioned problems for a general serial printer.

For purposes of the foregoing explanation, as in the fourth preferred embodiment, overlapped area 140C of FIG. 23 has a 16-dot length in the column direction. From the image data to be printed in this overlapped printing area, a break position is detected. Based on the detected break position, the image data for the overlapped printing area is divided between the printable areas so as to define area 140A to contain X, Y, and Z and to define printable area 140B to contain A, B, C, and D.

In this preferred embodiment, even if misalignment occurs during a dual directional printing due to a difference in printing direction, degradation of image quality is reduced. Reduction in degradation occurs because the image at the boundary of bands 140A and 140B is divided at the break position. Furthermore, this preferred embodiment provides the same benefits for a generic serial printer which are described in the fourth preferred embodiment.

In a conventional serial printing method, an image shows density differences, banding or registration misalignment between areas adjacent in the direction of printhead scanning or in the direction of the printing element array. To address these problems, this invention detects a break position within an overlapped area using at least one of a plurality of break detection systems on image data to be printed within the overlapped printing area. Based on a detected break position, the image data for the overlapped printing area is selectively divided among the multiple printable areas, and printing is performed in the multiple printable areas based on the divided image data. Therefore, image quality degradation due to the above problems is reduced.

Density differences in an image can be reduced to some extent by providing density corrections based on the temperature, timing or density characteristics. Banding can be reduced to some extent by adjusting the image density at the edges of bands. The registration misalignment can be reduced to some extent by mechanical or electrical registration adjustment. Application of break detection and image division according to the present invention provides further improvement.

Moreover, break detection can be performed upon image data lacking a straight break in the direction of a character row or column, and for multiple-bit level image data. Hence, a printing device can provide a printed image having reduced image degradation irrespective of the type of image data printed.

In the above preferred embodiments, break detection, image division, and binarization are performed by printer driver 103 in a host computer. This arrangement reduces the processing load on a printing device. This arrangement also reduces data transfer time because binary data is sent to the printing device. In contrast, all of the above processing can be performed within a printing device. In this case, the data which is transferred from a host computer to the printing device is of a multiple-bit level. Alternatively, the above processing can be shared between a host computer and a printing device. In this case, the processing load can be distributed.

Furthermore, the above explanations describe nozzles and printheads which print black ink. However, the above-described processes can be performed for nozzles or printheads of other colors. In such a case, it should be understood that separate break positions may be detected for each color and separate printable areas may be defined with regard to the separate positions.

In the above preferred embodiments, the number of nozzles on a printhead for each of C, M, and Y is 24 and 64 are used for K. However, the number of nozzles may be the same for all colors. Furthermore, one printhead does not necessarily need to be formed containing all colors. Rather, each color may have its own printhead.

In addition, this invention is applicable to any printing device which uses paper, cloth, leather, transparencies, metal and others as a print media. Examples of such applicable printing devices include office document devices such as a printer, photocopier, and facsimile machine, as well as industrial production equipment.

While the present invention is described above with respect to what is currently considered to be its preferred embodiments, it is to be understood that the invention is not limited to the disclosed embodiments. To the contrary, the invention is intended to cover various modifications and equivalent arrangements included within the spirit and scope of the appended claims.

What is claimed is:

1. An image printing method in which an image is printed within an overlapped printing area, the overlapped printing area having a range printable by each of more than one print scan for printing image data within the overlapped printing area, the method comprising:
   detecting a break position in image data to be printed within the overlapped printing area by using a break detection system capable of detecting both continuous and discontinuous breaks;
   selectively dividing, at the detected break position and among the more than one print scans, the image data to be printed within the overlapped printing area; and
   printing the divided image data within multiple printable areas,
   wherein the overlapped printing area exists regardless of whether the image data contains a break.

2. An image printing method according to claim 1, wherein the image data is multilevel image data, and
   wherein said detection step detects a break position based on a predetermined threshold density.

3. An image printing method according to claim 2, wherein said detection step detects, as a break position, a position where a density of image data is less than a predetermined density.

4. An image printing method according to claim 2, wherein said detection step detects, as a break position, a position where a density of image data is greater than a predetermined density.

5. An image printing method according to claim 2, wherein said detection step converts the multilevel image data into binary image data when a break position cannot be detected, and
   wherein said detection step detects, as a break position, a position where the binary image data contains null data.

6. An image printing method according to claim 2, further comprising converting the multilevel image data into high-resolution multilevel image data after said detection step.

7. An image printing method according to claim 1, wherein the image data is binary image data, and said detection step detects, as a break position, a position at which the image data contains null data.

8. An image printing method according to claim 1, wherein said image data is binary, and
   wherein said detection step detects, as a break position, a position at which the image data contains less than a predetermined number of dots.

9. An image printing method according to claim 1, wherein said detection step detects a break position block-by-block, each block consisting of a plurality of dots.

10. An image printing method according to claim 1, wherein said detection step detects a break position dot-by-dot.

11. An image printing method according to claim 1, further comprising printing the multiple printable areas simultaneously using multiple printheads, wherein the multiple printheads are disposed at a predetermined distance from each other in a scanning direction.

12. An image printing method according to claim 11, wherein the multiple printable areas define the overlapped printing area by overlapping in the scanning direction.

13. An image printing method according to claim 11, wherein printing is performed within the multiple printable areas by scanning the printheads across the multiple printable areas multiple times.

14. An image printing method according to claim 13, wherein the multiple printable areas define the overlapped printing area by overlapping in a direction different from the scanning direction of the printheads.

15. An image printing method according to claim 14, wherein printing is performed within the multiple printable areas by scanning the printheads across the multiple printable areas in a same direction.

16. An image printing method according to claim 14, wherein printing is performed within the multiple printable areas by scanning the printheads across the multiple printable areas in different directions.

17. An image printing method according to claim 14, wherein a dimension of the multiple printable areas in the direction different from the scanning direction is less than a width of the printheads.

18. An image printing method according to claim 17, wherein the dimension of the multiple printable areas in the direction different from the scanning direction is less than the width of the printheads when an image data density is higher than a predetermined number.

19. An image printing method according to claim 13, wherein the multiple printable areas define the overlapped printing area by overlapping in the scanning direction.

20. An image printing method according to claim 19, wherein the multiple printable areas are defined by a position at which an interruption of a scan of the printheads across the overlapped 1printing area and re-initiation of the scan of the printheads across the overlapped printing area occurs.

21. An image printing method according to claim 20, wherein a scan of the printheads is interrupted when a temperature of the printheads increases above a predetermined temperature, and
wherein a scan is re-initiated after a predetermined condition is satisfied.

22. An image printing method according to claim 1, wherein, in a case that said detection step does not detect a break position, said division step divides the image data to be printed within the overlapped printing area based on a predetermined rule.

23. An image printing method according to claim 22, wherein, in a case that said detection step does not detect a break position, said division step divides the image data to be printed within the overlapped printing area using a degradation mask pattern in which a mask ratio varies gradually.

24. An image printing method according to claim 1, wherein the image data contains multiple colors,
wherein said detection step detects a break position in image data corresponding to each color, and
wherein said division step selectively divides, at the detected break position for each color and among the multiple printable areas, image data of each color to be printed within the overlapped printing area.

25. An image printing device which prints an image by scanning printheads across a print medium and in which the image is formed within an overlapped printing area, the overlapped printing area having a range printable by each of more than one print scan for printing image data within the overlapped printing area, the printing device comprising:
detection means for detecting a break position in image data to be printed within the overlapped printing area using a break detection system capable of detecting continuous and discontinuous breaks;
dividing means for selectively dividing, at the detected break position and among the more than one print scans, the image data to be printed within the overlapped printing area; and
printing means for printing the divided image data within multiple printable areas,
wherein the overlapped printing area exists regardless of whether the image data contains a break.

26. An image printing device according to claim 25, wherein the image data is multilevel image data, and
wherein said detection means detects a break position based on a predetermined threshold density.

27. An image printing device according to claim 26, wherein said detection means detects, as a break position, a position where a density of image data is less than a predetermined density.

28. An image printing device according to claim 26, wherein said detection means detects, as a break position, a position where a density of image data is greater than a predetermined density.

29. An image printing device according to claim 26, wherein said detection means converts the multilevel image data into binary image data when a break position cannot be detected, and
wherein said detection means detects, as a break position, a position where the binary image data contains null data.

30. An image printing device according to claim 26, further comprising conversion means for converting the multilevel image data into high resolution multilevel image data after said detection of a break position.

31. An image printing device according to claim 25, wherein the image data is binary image data, and said detection means detects, as a break position, a position at which the image data contains null data.

32. An image printing device according to claim 25, wherein said image data is binary, and
wherein said detection means detects, as a break position, a position at which the image data contains less than a predetermined number of dots.

33. An image printing device according to claim 25, wherein said detection means detects a break position block-by-block, each block consisting of a plurality of dots.

34. An image printing device according to claim 25, wherein said detection means detects a break position dot-by-dot.

35. An image printing device according to claim 25, further comprising printing means for printing the multiple printable areas simultaneously using the multiple printheads, wherein the multiple printheads are disposed at a predetermined distance from each other in a scanning direction.

36. An image printing device according to claim 35, wherein the multiple printable areas define the overlapped printing area by overlapping in the scanning direction.

37. An image printing device according to claim 25, wherein printing is performed within the multiple printable areas by scanning the printheads across the multiple printable areas multiple times.

38. An image printing device according to claim 37, wherein the multiple printable areas define the overlapped printing area by overlapping in a direction different from a scanning direction of the printheads.

39. An image printing device according to claim 38, wherein printing is performed within the multiple printable areas by scanning the printheads across the multiple printable areas in a same direction.

40. An image printing device according to claim 38, wherein printing is performed within the multiple printable areas by scanning the printheads across the multiple printable areas in different directions.

41. An image printing device according to claim 38, wherein a dimension of the multiple printable areas in the direction different from the scanning direction is less than a width of the printheads.

42. An image printing device according to claim 41, wherein the dimension of the multiple printable areas in the direction different from the scanning direction is less than the width of the printheads when an image data density is higher than a predetermined number.

43. An image printing device according to claim 37, wherein the multiple printable areas define the overlapped printing area by overlapping in the scanning direction of the printheads.

44. An image printing device according to claim 43, wherein the multiple printable areas are defined by a position at which an interruption of a scan of the printheads across the overlapped printing area and re-initiation of the scan of the printheads across the overlapped printing area occurs.

45. An image printing device according to claim 44, wherein a scan of the printheads is interrupted when a temperature of the printheads increases above a predetermined temperature, and wherein a scan is re-initiated after a predetermined condition is satisfied.

46. An image printing device according to claim 25, wherein, in a case that said detection means does not detect a break position, said dividing means divides the image data to be printed within the overlapped printing area based on a predetermined rule.

47. An image printing device according to claim 46, wherein, in a case that said detection means does not detect a break position, said dividing means divides the image data to be printed within the overlapped printing area using a degradation mask pattern in which a mask ratio varies gradually.

48. An image printing device according to claim 25, wherein the image data contains multiple colors,
wherein said detection means detects a break position in image data corresponding to each color, and
wherein said dividing means selectively divides, at the detected break position for each color and among the multiple printable areas, image data of each color to be printed within the overlapped printing area.

49. A printer driver installed in a host computer, the printer driver controlling a printer which scans printheads against a print medium and which prints an image within an overlapped printing area, the overlapped printing area having a range printable by each of more than one print scan for printing image data within the overlapped printing area, the printer driver comprising:
processor-executable code to detect a break position in image data to be printed within the overlapped printing area using a break detection system capable of detected continuous and discontinuous breaks;
processor-executable codes to selectively divide, at the detected break position and among the more than one print scans, the image data to be printed within the overlapped printing area; and
processor-executable codes to print the divided image data within multiple printable areas,
wherein the overlapped printing area exists regardless of whether the image data contains a break.

50. A printer driver according to claim 49, wherein the image data is multilevel image data, and
wherein said codes to detect are to detect a break position based on a predetermined threshold density.

51. A printer driver according to claim 50, wherein said codes to detect are to detect, as a break position, a position where a density of image data is less than a predetermined density.

52. A printer driver according to claim 50, wherein said codes to detect are to detect, as a break position, a position where a density of image data is greater than a predetermined density.

53. A printer driver according to claim 50, wherein said codes to detect are to convert the multilevel image data into binary image data when a break position cannot be detected, and
wherein said codes to detect are to detect, as a break position, a position where the binary image data contains null data.

54. A printer driver according to claim 49, further comprising processor-executable codes to convert the multilevel image data into high-resolution multilevel image data after detection of a break position.

55. A printer driver according to claim 49, wherein the image data is binary image data, and
wherein said codes to detect are to detect, as a break position, a position at which the image data contains null data.

56. A printer driver according to claim 49, wherein said image data is binary, and
wherein said codes to detect are to detect, as a break position, a position at which the image data contains less than a predetermined number of dots.

57. A printer driver according to claim 49, wherein said codes to detect are to detect a break position block-by-block, each block consisting of a plurality of dots.

58. A printer driver according to claim 49, wherein said codes to detect are to detect a break position dot-by-dot.

59. A printer driver according to claim 49, further comprising processor-executable printing codes to print the multiple printable areas simultaneously using the multiple printheads, wherein the multiple printheads are disposed at a predetermined distance from each other in a scanning direction.

60. A printer driver according to claim 59, wherein the multiple printable areas define the overlapped printing area by overlapping in the scanning direction.

61. A printer driver according to claim 49, wherein printing is performed within the multiple printable areas by scanning the printheads across the multiple printable areas multiple times.

62. A printer driver according to claim 61, wherein the multiple printable areas define the overlapped printing area by overlapping in a direction different from a scanning direction of the printheads.

63. A printer driver according to claim 62, wherein printing is performed within the multiple printable areas by scanning the printheads across the multiple printable areas in a same direction.

64. A printer driver according to claim 62, wherein printing is performed within the multiple printable areas by scanning the printheads across the multiple printable areas in different directions.

65. A printer driver according to claim 62, wherein a dimension of the multiple printable areas in the direction different from the scanning direction is less than a width of the printheads.

66. A printer driver according to claim 65, wherein the dimension of the multiple printable areas in the direction different from the scanning direction is less than the width of the printheads when an image data density is higher than a predetermined number.

67. A printer driver according to claim 61, wherein the multiple printable areas define the overlapped printing area by overlapping in the scanning direction of the printheads.

68. A printer driver according to claim 67, wherein the multiple printable areas are defined by a position at which an interruption of a scan of the printheads across the overlapped printing area and re-initiation of the scan of the printheads across the overlapped printing area occurs.

69. A printer driver according to claim 68, wherein a scan of the printheads is interrupted when a temperature of the printheads increases above a predetermined temperature, and
wherein a scan is re-initiated after a predetermined condition is satisfied.

70. A printer driver according to claim 49, wherein, in a case that a break position is not detected, image data to be printed is divided within the overlapped printing area based on a predetermined rule.

71. A printer driver according to claim 70, wherein, in a case that a break position is not detected, the image data to be printed is divided within the overlapped printing area using a degradation mask pattern in which a mask ratio varies gradually.

72. A printer driver according to claim 49, wherein the image data contains multiple colors, wherein said codes to detect are to detect a break position in image data corresponding to each color, and wherein said codes to divide are to selectively divide, among the multiple printable areas, image data of each color to be printed within the overlapped printing area at the detected break position corresponding to each color.

73. An image printing method in which multilevel image data is printed within multiple printable areas of a recording medium the method comprising:

detecting a break position in the multilevel image data using a break detecting system capable of detecting continuous and discontinuous breaks;

selectively dividing, at the detected break position and among the multiple printable areas, the multilevel data to be printed; and printing the divided multilevel image data within the multiple printable areas, wherein the multiple printable areas comprise an overlapped printing area, which exists regardless of whether the image data contains a break.

74. An image printing method according to claim 73, wherein said detection step detects a break position based on a predetermined threshold density.

75. An image printing method according to claim 74, wherein said detection step detects, as a break position, a position where a density of image data is less than a predetermined density.

76. An image printing method according to claim 74, wherein said detection step detects, as a break position, a position where a density of image data is greater than a predetermined density.

77. An image printing method according to claim 74, wherein said detection step converts the multilevel data into binary image data when a break position cannot be detected, and wherein said detection step detects, as a break position, a position where the binary image data contains null data.

78. An image printing method according to claim 74, further comprising converting the multilevel image data into high-resolution multilevel image data after said detection step.

79. An image printing device in which multilevel image data is printed within multiple printable areas of a recording medium, the device comprising:

detection means for detecting a break position in the multilevel image data using a break detection system capable of detecting continuous and discontinuous breaks;

dividing means for selectively dividing, at the detected break position and among the multiple printable areas, the multilevel data to be printed; and printing means for printing the divided multilevel image data within the multiple printable areas, wherein the multiple printable areas comprise an overlapped printing area, which exists regardless of whether the image data contains a break.

80. An image printing device according to claim 79, wherein said detection means detects a break position based on a predetermined threshold density.

81. An image printing device according to claim 80, wherein said detection means detects, as a break position, a position where a density of image data is less than a predetermined density.

82. An image printing device according to claim 80, wherein said detection means detects, as a break position, a position where a density of image data is greater than a predetermined density.

83. An image printing device according to claim 80, wherein said detection means converts the multilevel data into binary image data when a break position cannot be detected, and wherein said detection means detects, as a break position, a position where the binary image data contains null data.

84. An image printing method according to claim 80, wherein said detection means converts the multilevel image data into high-resolution multilevel image data after said detection of a break position.

85. A printer driver installed in a host computer, the printer driver controlling a printer which scans printheads against a print medium and which prints an image within multiple printable areas, the printer driver comprising:

processor-executable code to detect a break position in multilevel image data using a break detection system capable of detecting continuous and discontinuous breaks;

processor-executable code to selectively divide, at the detected break position and among the multiple printable areas, the multilevel data to be printed; and processor-executable code to print the divided multilevel image data within the multiple printable areas, wherein the multiple printable areas comprise an overlapped printing area, which exists regardless of whether the image data contains a break.

86. A printer driver according to claim 85, wherein said code to detect is to detect a break position based on a predetermined threshold density.

87. A printer driver according to claim 86, wherein said code to detect is to detect, as a break position, a position where a density of image data is less than a predetermined density.

88. A printer driver according to claim 86, wherein said code to detect is to detect, as a break position, a position where a density of image data is greater than a predetermined density.

89. A printer driver according to claim 86, wherein said code to detect is to convert the multilevel data into binary image data when a break position cannot be detected, and wherein said code to detect is to detect, as a break position, a position where the binary image data contains null data.

90. A printer driver according to claim 86, further comprising processor-executable code to convert the multilevel image data into high-resolution multilevel image data after detection of a break position.

* * * * *

UNITED STATES PATENT AND TRADEMARK OFFICE
CERTIFICATE OF CORRECTION

| | | |
|---|---|---|
| PATENT NO. | : 6,563,601 B1 | |
| APPLICATION NO. | : 08/901565 | |
| DATED | : May 13, 2003 | |
| INVENTOR(S) | : Akitoshi Yamada et al. | |

It is certified that error appears in the above-identified patent and that said Letters Patent is hereby corrected as shown below:

ON THE COVER PAGE

(73) Assignee: "Canon Business Machines, Inc., Costa Mesa, CA (US)" should read --Canon Kabushiki Kaisha, Tokyo, Japan--.

COLUMN 5

Line 14, "Ad ink jet" should read --ink jet--.

COLUMN 7

Line 1, "realizing-the" should read --realizing the--; and
Line 37, "enable'signal" should read --enable signal--.

COLUMN 8

Line 63, "Difference" should read --difference--.

COLUMN 12

Line 4, "A data" should read --data--; and
Line 11, "the-same" should read --the same--.

COLUMN 13

Line 21, "would-" should read --would--.

COLUMN 15

Line 22, "pete." should read --plete.--; and
Line 65, "between-two" should read --between two--.

UNITED STATES PATENT AND TRADEMARK OFFICE
CERTIFICATE OF CORRECTION

PATENT NO. : 6,563,601 B1
APPLICATION NO. : 08/901565
DATED : May 13, 2003
INVENTOR(S) : Akitoshi Yamada et al.

It is certified that error appears in the above-identified patent and that said Letters Patent is hereby corrected as shown below:

COLUMN 16

Line 45, "as the" should read --as--.

COLUMN 18

Line 1, "entire" should read --entirely--.

COLUMN 21

Line 1, "1printing" should read --printing--.

COLUMN 25

Line 10, "medium the" should read --medium, the--.

Signed and Sealed this

Fifth Day of December, 2006

JON W. DUDAS
*Director of the United States Patent and Trademark Office*